US012465324B2

(12) United States Patent
Sweeney et al.

(10) Patent No.: US 12,465,324 B2
(45) Date of Patent: *Nov. 11, 2025

(54) PATIENT FLUID MANAGEMENT SYSTEMS AND METHODS EMPLOYING INTEGRATED FLUID STATUS SENSING

(71) Applicant: Foundry Innovation & Research 1, Ltd., Dublin (IE)

(72) Inventors: Fiachra M. Sweeney, Dublin (IE); Hanson S. Gifford, III, Woodside, CA (US); Annette Kent, Dublin (IE); Conor M. Hanley, Dublin (IE)

(73) Assignee: Foundry Innovation & Research 1, Ltd., Dublin (IE)

( * ) Notice: Subject to any disclaimer, the term of this patent is extended or adjusted under 35 U.S.C. 154(b) by 882 days.

This patent is subject to a terminal disclaimer.

(21) Appl. No.: 17/245,020

(22) Filed: Apr. 30, 2021

(65) Prior Publication Data

US 2021/0244381 A1    Aug. 12, 2021

Related U.S. Application Data

(63) Continuation-in-part of application No. 17/162,857, filed on Jan. 29, 2021, and a continuation-in-part of
(Continued)

(51) Int. Cl.
*A61B 8/08* (2006.01)
*A61B 5/00* (2006.01)
(Continued)

(52) U.S. Cl.
CPC .......... *A61B 8/0891* (2013.01); *A61B 5/1076* (2013.01); *A61B 5/6882* (2013.01);
(Continued)

(58) Field of Classification Search
CPC ... A61B 5/1076; A61B 5/0215; A61B 8/0891; A61B 8/12
See application file for complete search history.

(56) References Cited

U.S. PATENT DOCUMENTS

| 3,568,661 A | 3/1971 | Franklin |
| 3,838,683 A | 10/1974 | Kolin |

(Continued)

FOREIGN PATENT DOCUMENTS

| AU | 2013206194 B2 | 4/2015 |
| CN | 108712880 A | 10/2018 |

(Continued)

OTHER PUBLICATIONS

International Search Report and Written Opinion dated Mar. 27, 2018, in connection with PCT/US2017/063749.
(Continued)

*Primary Examiner* — John D Li
(74) *Attorney, Agent, or Firm* — Downs Rachlin Martin PLLC

(57) ABSTRACT

Patient fluid management systems, particularly for use in treating patients at various stages of heart failure, are disclosed. Disclosed systems employ vascular dimension monitoring sensors to provide accurate, early, real-time estimation of circulating blood volume as an input metric to the system control, allowing for more accurate modulation of treatment based on the patient's current fluid volume state.

19 Claims, 12 Drawing Sheets

Related U.S. Application Data application No. 16/271,798, filed on Feb. 9, 2019, now Pat. No. 11,564,596, which is a continuation of application No. PCT/US2017/046204, filed on Aug. 10, 2017, said application No. 17/162,857 is a continuation of application No. 15/549,042, filed as application No. PCT/US2016/017902 on Feb. 12, 2016, now Pat. No. 10,905,393.

(60) Provisional application No. 63/017,958, filed on Apr. 30, 2020, provisional application No. 62/534,329, filed on Jul. 19, 2017, provisional application No. 62/427,631, filed on Nov. 29, 2016, provisional application No. 62/373,436, filed on Aug. 11, 2016, provisional application No. 62/172,516, filed on Jun. 8, 2015, provisional application No. 62/157,331, filed on May 5, 2015, provisional application No. 62/115,435, filed on Feb. 12, 2015.

(51) Int. Cl.
*A61B 5/107* (2006.01)
*A61B 8/00* (2006.01)
*A61B 8/12* (2006.01)
*A61B 90/00* (2016.01)

(52) U.S. Cl.
CPC ............... *A61B 8/12* (2013.01); *A61B 8/565* (2013.01); *A61B 90/39* (2016.02); *A61B 5/4836* (2013.01); *A61B 5/4839* (2013.01); *A61B 2090/3929* (2016.02); *A61B 2090/3987* (2016.02); *A61B 2090/3991* (2016.02)

(56) References Cited

U.S. PATENT DOCUMENTS

| | | | |
|---|---|---|---|
| 4,142,412 A | 3/1979 | McLeod | |
| 4,638,252 A | 1/1987 | Bradshaw | |
| RE32,361 E | 2/1987 | Duggan | |
| 4,733,669 A | 3/1988 | Segal | |
| 4,926,875 A | 5/1990 | Rabinovitz et al. | |
| 4,947,852 A | 8/1990 | Nassi et al. | |
| 5,127,404 A | 7/1992 | Wyborny et al. | |
| 5,205,292 A | 4/1993 | Czar et al. | |
| 5,316,001 A | 5/1994 | Ferek-Petric et al. | |
| 5,339,816 A | 8/1994 | Akamatsu et al. | |
| 5,363,848 A | 11/1994 | Spani et al. | |
| 5,476,484 A | 12/1995 | Hedberg | |
| 5,495,852 A | 3/1996 | Stadler et al. | |
| 5,630,836 A | 5/1997 | Prem et al. | |
| 5,752,522 A | 5/1998 | Murphy | |
| 5,760,341 A | 6/1998 | Laske | |
| 5,872,520 A | 2/1999 | Siefert et al. | |
| 5,902,308 A | 5/1999 | Murphy | |
| 5,967,986 A | 10/1999 | Cimochowski | |
| 5,971,933 A | 10/1999 | Gopakumaran | |
| 6,010,511 A | 1/2000 | Murphy | |
| 6,012,457 A | 1/2000 | Lesh | |
| 6,015,386 A | 1/2000 | Kensey et al. | |
| 6,015,387 A | 1/2000 | Schwartz et al. | |
| 6,025,725 A | 2/2000 | Gershenfeld et al. | |
| 6,039,701 A | 3/2000 | Sliwa et al. | |
| 6,053,873 A | 4/2000 | Govari et al. | |
| 6,111,520 A | 8/2000 | Allen et al. | |
| 6,115,633 A | 9/2000 | Lang et al. | |
| 6,115,636 A | 9/2000 | Ryan | |
| 6,164,283 A | 12/2000 | Lesh | |
| 6,165,135 A * | 12/2000 | Neff | A61B 5/031 600/561 |
| 6,206,835 B1 | 3/2001 | Spillman, Jr. et al. | |
| 6,231,516 B1 | 5/2001 | Keilman et al. | |
| 6,261,233 B1 | 7/2001 | Kantorovich | |
| 6,278,379 B1 | 8/2001 | Allen et al. | |
| 6,287,253 B1 | 9/2001 | Ortega et al. | |
| 6,325,762 B1 | 12/2001 | Tjin | |
| 6,339,816 B1 | 1/2002 | Bausch | |
| 6,354,999 B1 | 3/2002 | Dgany et al. | |
| 6,398,734 B1 | 6/2002 | Cimochowski et al. | |
| 6,434,411 B1 | 8/2002 | Duret | |
| 6,503,202 B1 | 1/2003 | Hossack et al. | |
| 6,574,510 B2 | 6/2003 | Von Arx et al. | |
| 6,673,020 B2 | 1/2004 | Okada et al. | |
| 6,699,186 B1 | 3/2004 | Wolinsky et al. | |
| 6,738,671 B2 | 5/2004 | Christophersom et al. | |
| 6,776,763 B2 | 8/2004 | Nix | |
| 6,802,811 B1 | 10/2004 | Slepian | |
| 6,855,115 B2 | 2/2005 | Fonseca | |
| 6,895,265 B2 | 5/2005 | Silver | |
| 6,926,670 B2 | 8/2005 | Rich et al. | |
| 6,972,553 B2 | 12/2005 | Petrovich et al. | |
| 7,065,409 B2 | 6/2006 | Mazar | |
| 7,077,812 B2 | 7/2006 | Naghavi | |
| 7,082,330 B2 | 7/2006 | Stadler et al. | |
| 7,147,604 B1 | 12/2006 | Allen | |
| 7,149,587 B2 | 12/2006 | Wardle et al. | |
| 7,191,013 B1 | 3/2007 | Miranda et al. | |
| 7,225,032 B2 | 5/2007 | Schmeling et al. | |
| 7,233,821 B2 | 6/2007 | Hettrick et al. | |
| 7,236,821 B2 | 6/2007 | Cates et al. | |
| 7,245,117 B1 | 7/2007 | Joy | |
| 7,265,676 B2 | 9/2007 | Gordon et al. | |
| 7,284,442 B2 | 10/2007 | Fleischman et al. | |
| 7,367,984 B2 | 5/2008 | Kulcinski et al. | |
| 7,423,496 B2 | 9/2008 | Scheuermann | |
| 7,432,723 B2 | 10/2008 | Ellis | |
| 7,439,723 B2 | 10/2008 | Allen | |
| 7,444,878 B2 | 11/2008 | Pepples | |
| 7,452,334 B2 | 11/2008 | Gianchandani et al. | |
| 7,454,244 B2 | 11/2008 | Kassab et al. | |
| 7,466,120 B2 | 12/2008 | Miller | |
| 7,479,112 B2 | 1/2009 | Sweeney et al. | |
| 7,481,771 B2 | 1/2009 | Fonseca | |
| 7,492,144 B2 | 2/2009 | Powers | |
| 7,498,799 B2 | 3/2009 | Allen | |
| 7,550,978 B2 | 6/2009 | Joy | |
| 7,574,792 B2 | 8/2009 | O'Brien | |
| 7,595,647 B2 | 9/2009 | Kroh | |
| 7,618,363 B2 | 11/2009 | Yadav | |
| 7,621,036 B2 | 11/2009 | Cros | |
| 7,621,876 B2 | 11/2009 | Hoctor et al. | |
| 7,647,831 B2 | 1/2010 | Corcoran | |
| 7,647,836 B2 | 1/2010 | O'Brien | |
| 7,662,653 B2 | 2/2010 | O'Brien | |
| 7,667,547 B2 | 2/2010 | Ellis | |
| 7,677,107 B2 | 3/2010 | Nunez | |
| 7,678,135 B2 | 3/2010 | Maahs et al. | |
| 7,679,355 B2 | 3/2010 | Allen | |
| 7,699,059 B2 | 4/2010 | Fonseca | |
| 7,710,103 B2 | 5/2010 | Powers | |
| 7,725,160 B2 | 5/2010 | Weber | |
| 7,748,277 B2 | 7/2010 | O'Brien | |
| 7,778,684 B2 | 8/2010 | Weber et al. | |
| 7,786,867 B2 | 8/2010 | Hamel et al. | |
| 7,812,416 B2 | 10/2010 | Courcimault | |
| 7,829,363 B2 | 11/2010 | You | |
| 7,831,301 B2 | 11/2010 | Webb et al. | |
| 7,839,153 B2 | 11/2010 | Joy | |
| 7,848,813 B2 | 12/2010 | Bergelson et al. | |
| 7,854,172 B2 | 12/2010 | O'Brien | |
| 7,899,545 B2 | 3/2011 | John | |
| 7,908,002 B2 | 3/2011 | Hoijer | |
| 7,908,018 B2 | 3/2011 | O'Brien | |
| 7,909,770 B2 | 3/2011 | Stern | |
| 7,932,732 B2 | 4/2011 | Ellis | |
| 7,936,174 B2 | 5/2011 | Ellis | |
| 7,955,269 B2 | 6/2011 | Stahmann | |
| 7,966,886 B2 | 6/2011 | Corcoran | |
| 7,988,719 B2 | 8/2011 | Alt et al. | |
| 8,016,766 B2 | 9/2011 | Goedje et al. | |
| 8,021,307 B2 | 9/2011 | White | |
| 8,025,625 B2 | 9/2011 | Allen | |
| 8,026,729 B2 | 9/2011 | Kroh | |

(56) References Cited

U.S. PATENT DOCUMENTS

| | | |
|---|---|---|
| 8,060,214 B2 | 11/2011 | Larson et al. |
| 8,078,274 B2 | 12/2011 | Kassab |
| 8,082,032 B2 | 12/2011 | Kassab et al. |
| 8,099,161 B2 | 1/2012 | Kassab |
| 8,107,248 B2 | 1/2012 | Shin et al. |
| 8,111,150 B2 | 2/2012 | Miller |
| 8,114,143 B2 | 2/2012 | Kassab et al. |
| 8,118,749 B2 | 2/2012 | White |
| 8,154,389 B2 | 4/2012 | Rowland |
| 8,159,348 B2 | 4/2012 | Ellis |
| 8,185,194 B2 | 5/2012 | Kassab |
| 8,209,033 B2 | 6/2012 | Zhang et al. |
| 8,221,405 B2 | 7/2012 | Whisenant et al. |
| 8,237,451 B2 | 8/2012 | Joy |
| 8,264,240 B2 | 9/2012 | Park |
| 8,267,954 B2 | 9/2012 | Decant, Jr. et al. |
| 8,271,072 B2 | 9/2012 | Houben et al. |
| 8,278,941 B2 | 10/2012 | Kroh |
| 8,298,147 B2 | 10/2012 | Huennekens et al. |
| 8,298,148 B2 | 10/2012 | Furman |
| 8,353,841 B2 | 1/2013 | White |
| 8,355,777 B2 | 1/2013 | White |
| 8,356,399 B2 | 1/2013 | Kaplan |
| 8,360,984 B2 | 1/2013 | Yadar |
| 8,374,689 B2 | 2/2013 | Gopinathan et al. |
| 8,414,495 B2 | 4/2013 | Halmann |
| 8,432,265 B2 | 4/2013 | Rowland |
| 8,442,606 B2 | 5/2013 | Furman |
| 8,442,639 B2 | 5/2013 | Walker et al. |
| 8,465,436 B2 | 6/2013 | Griswold |
| 8,465,452 B2 | 6/2013 | Kassab |
| 8,467,854 B2 | 6/2013 | Lewis et al. |
| 8,480,594 B2 | 7/2013 | Eigler et al. |
| 8,493,187 B2 | 7/2013 | Rowland |
| 8,500,660 B2 | 8/2013 | Buchwald et al. |
| 8,521,282 B2 | 8/2013 | Czygan et al. |
| 8,527,046 B2 | 9/2013 | Connelly et al. |
| 8,556,929 B2 | 10/2013 | Harper et al. |
| 8,570,186 B2 | 10/2013 | Nagy |
| 8,600,517 B2 | 12/2013 | Forsell |
| 8,613,705 B2 | 12/2013 | Scheurer et al. |
| 8,632,469 B2 | 1/2014 | Kassab |
| 8,644,941 B2 | 2/2014 | Rooney et al. |
| 8,665,086 B2 | 3/2014 | Miner |
| 8,669,770 B2 | 3/2014 | Cros |
| 8,696,584 B2 | 4/2014 | Kassab |
| 8,702,613 B2 | 4/2014 | Kassab |
| 8,706,208 B2 | 4/2014 | Chiao et al. |
| 8,706,209 B2 | 4/2014 | Kassab |
| 8,706,219 B2 | 4/2014 | Feldman |
| 8,728,012 B2 | 5/2014 | Braido |
| 8,747,313 B2 | 6/2014 | Tran et al. |
| 8,784,338 B2 | 7/2014 | Wallace |
| 8,798,712 B2 | 8/2014 | Gopinathan et al. |
| 8,814,798 B2 | 8/2014 | Corbucci et al. |
| 8,818,507 B2 | 8/2014 | Liu et al. |
| 8,825,151 B2 | 9/2014 | Gopinathan et al. |
| 8,827,904 B2 | 9/2014 | Ball et al. |
| 8,827,929 B2 | 9/2014 | D'Dea |
| 8,855,783 B2 | 10/2014 | Dagan et al. |
| 8,864,666 B2 | 10/2014 | Kassem |
| 8,870,787 B2 | 10/2014 | Yadav |
| 8,874,203 B2 | 10/2014 | Kassab et al. |
| 8,886,301 B2 | 11/2014 | Kassab |
| 8,894,582 B2 | 11/2014 | Nunez |
| 8,896,324 B2 | 11/2014 | Kroh |
| 8,909,351 B2 | 12/2014 | Dinsmoor et al. |
| 8,918,169 B2 | 12/2014 | Kassab et al. |
| 8,938,292 B2 | 1/2015 | Hettrick et al. |
| 8,951,219 B2 | 2/2015 | Gerber et al. |
| 9,049,995 B2 | 6/2015 | Blomqvist et al. |
| 9,055,917 B2 | 6/2015 | Mann et al. |
| 9,060,798 B2 | 6/2015 | Harper et al. |
| 9,061,099 B2 | 6/2015 | Gerber et al. |
| 9,066,672 B2 | 6/2015 | Kassab et al. |
| 9,089,713 B2 | 7/2015 | John et al. |
| 9,162,065 B2 | 10/2015 | Karst et al. |
| 9,198,706 B2 | 12/2015 | Kassab et al. |
| 9,265,428 B2 | 2/2016 | O'Brien et al. |
| 9,289,132 B2 | 3/2016 | Ghaffari et al. |
| 9,289,229 B2 | 3/2016 | Kassab |
| 9,305,456 B2 | 4/2016 | Rowland |
| 9,314,169 B2 | 4/2016 | Kassab |
| 9,326,728 B2 | 5/2016 | Demir et al. |
| 9,332,914 B2 | 5/2016 | Langston |
| 9,332,916 B2 | 5/2016 | Kassab |
| 9,333,365 B2 | 5/2016 | Zhao |
| 9,351,661 B2 | 5/2016 | Kassab |
| 9,392,940 B2 | 7/2016 | Snichelotto |
| 9,393,416 B2 | 7/2016 | Rooney et al. |
| 9,445,743 B2 | 9/2016 | Kassab |
| 9,489,831 B2 | 11/2016 | Nagy et al. |
| 9,526,637 B2 | 12/2016 | Dagan et al. |
| 9,545,263 B2 | 1/2017 | Lenihan et al. |
| 9,603,533 B2 | 3/2017 | Lading et al. |
| 9,662,066 B2 | 5/2017 | Ledet et al. |
| 9,675,257 B2 | 6/2017 | Kassab |
| 9,675,315 B2 | 6/2017 | Song et al. |
| 9,713,701 B2 | 7/2017 | Sarkar et al. |
| 9,717,475 B2 | 8/2017 | Corl |
| 9,721,463 B2 | 8/2017 | Rowland |
| 9,724,006 B2 | 8/2017 | Dumont et al. |
| 9,788,739 B2 | 10/2017 | John et al. |
| 9,814,395 B2 | 11/2017 | Stahmann et al. |
| 9,820,673 B2 | 11/2017 | Feldman |
| 9,872,948 B2 | 1/2018 | Siess |
| 9,878,080 B2 | 1/2018 | Kaiser et al. |
| 9,901,722 B2 | 2/2018 | Nitzan et al. |
| 9,996,712 B2 | 6/2018 | Sundaram et al. |
| 10,080,528 B2 | 9/2018 | BeBusschere et al. |
| 10,092,247 B2 | 10/2018 | Taylor |
| 10,105,103 B2 | 10/2018 | Goldshtein et al. |
| 10,194,808 B1 | 2/2019 | Thompson |
| 10,195,441 B2 | 2/2019 | Kaiser |
| 10,201,285 B2 | 2/2019 | Sawanoi |
| 10,210,956 B2 | 2/2019 | Lavi |
| 10,213,129 B2 | 2/2019 | Kassab |
| 10,219,704 B2 | 3/2019 | Lavi |
| 10,219,720 B2 | 3/2019 | Kassab |
| 10,219,724 B2 | 3/2019 | Stern |
| 10,226,203 B2 | 3/2019 | Stigall |
| 10,226,218 B2 | 3/2019 | Rowland |
| 10,231,659 B2 | 3/2019 | Vanslyke |
| 10,231,701 B2 | 3/2019 | Ryan |
| 10,236,084 B2 | 3/2019 | Grady |
| 10,238,311 B2 | 3/2019 | Kassab |
| 10,238,322 B2 | 3/2019 | Vanslyke |
| 10,238,323 B2 | 3/2019 | Vanslyke |
| 10,238,324 B2 | 3/2019 | Vanslyke |
| 10,240,994 B1 | 3/2019 | Xu |
| 10,265,024 B2 | 4/2019 | Lee |
| 10,271,797 B2 | 4/2019 | Zhang |
| 10,335,042 B2 | 7/2019 | Schoenie et al. |
| 10,390,714 B2 | 8/2019 | Wolinsky |
| 10,433,736 B2 | 10/2019 | Karlovsky et al. |
| 10,537,281 B2 | 1/2020 | Thompson et al. |
| 10,542,887 B2 | 1/2020 | Sarkar et al. |
| 10,548,535 B2 | 2/2020 | Zhang et al. |
| 10,555,704 B2 | 2/2020 | Averina et al. |
| 10,582,866 B2 | 3/2020 | Badie et al. |
| 10,588,528 B2 | 3/2020 | Banet et al. |
| 10,595,734 B2 | 3/2020 | Thakur et al. |
| 10,596,381 B2 | 3/2020 | Averina et al. |
| 10,638,980 B2 | 5/2020 | Gyllensten et al. |
| 10,660,577 B2 | 5/2020 | Thakur et al. |
| 10,687,715 B2 | 6/2020 | Jansen et al. |
| 10,702,213 B2 | 7/2020 | Sharma et al. |
| 10,806,352 B2 | 10/2020 | Sweeney et al. |
| 10,905,393 B2 | 2/2021 | Gifford, III et al. |
| 11,006,845 B2 | 5/2021 | Kuraguntla et al. |
| 11,039,813 B2 | 6/2021 | Gifford, III et al. |
| 11,272,840 B2 | 3/2022 | Rothfuss |
| 11,445,924 B2 | 9/2022 | Joseph |
| 11,452,497 B2 | 9/2022 | Garza |

(56) References Cited

U.S. PATENT DOCUMENTS

| | | |
|---|---|---|
| 11,890,082 B2 | 2/2024 | Cros et al. |
| 2002/0120205 A1 | 8/2002 | Ferek-Petric |
| 2002/0188207 A1 | 12/2002 | Richter |
| 2003/0037591 A1 | 2/2003 | Ashton et al. |
| 2003/0100940 A1 | 5/2003 | Yodfat |
| 2003/0135971 A1 | 7/2003 | Liberman |
| 2003/0158584 A1 | 8/2003 | Cates et al. |
| 2003/0199938 A1 | 10/2003 | Smits et al. |
| 2004/0054287 A1 | 3/2004 | Stephens |
| 2004/0106871 A1 | 6/2004 | Hunyor et al. |
| 2004/0116992 A1 | 6/2004 | Wardle |
| 2004/0133092 A1 | 7/2004 | Kain |
| 2004/0140939 A1 | 7/2004 | Haller et al. |
| 2004/0167596 A1 | 8/2004 | Richter |
| 2004/0176672 A1 | 9/2004 | Silver et al. |
| 2004/0215235 A1 | 10/2004 | Jackson et al. |
| 2004/0225326 A1 | 11/2004 | Weiner |
| 2005/0049686 A1 | 3/2005 | Gray et al. |
| 2005/0137481 A1 | 6/2005 | Sheard et al. |
| 2005/0148903 A1 | 7/2005 | Diamantopoulos |
| 2005/0154321 A1 | 7/2005 | Wolinsky |
| 2006/0047327 A1 | 3/2006 | Colvin et al. |
| 2006/0056161 A1 | 3/2006 | Shin |
| 2006/0079793 A1* | 4/2006 | Mann .................. A61B 5/4839 607/17 |
| 2006/0100522 A1 | 5/2006 | Yuan et al. |
| 2006/0106321 A1 | 5/2006 | Lewinsky et al. |
| 2006/0122522 A1 | 6/2006 | Chavan et al. |
| 2006/0149166 A1 | 7/2006 | Zvuloni |
| 2006/0174712 A1 | 8/2006 | O'Brien |
| 2006/0177956 A1 | 8/2006 | O'Brien |
| 2006/0178695 A1 | 8/2006 | Decant |
| 2006/0253160 A1 | 11/2006 | Benditt et al. |
| 2006/0271119 A1 | 11/2006 | Ni et al. |
| 2006/0280351 A1 | 12/2006 | Luping et al. |
| 2006/0287602 A1 | 12/2006 | Obrien et al. |
| 2006/0287700 A1 | 12/2006 | White |
| 2007/0043409 A1 | 2/2007 | Brian |
| 2007/0088214 A1* | 4/2007 | Shuros ................ A61B 8/4483 600/437 |
| 2007/0129637 A1 | 6/2007 | Wolinsky et al. |
| 2007/0158769 A1 | 7/2007 | You |
| 2007/0199385 A1 | 8/2007 | O'Brien |
| 2007/0238998 A1 | 10/2007 | Nycz et al. |
| 2007/0249950 A1 | 10/2007 | Piaget et al. |
| 2007/0274565 A1 | 11/2007 | Penner |
| 2007/0282210 A1 | 12/2007 | Stern |
| 2007/0292090 A1 | 12/2007 | Alphonse et al. |
| 2008/0015569 A1 | 1/2008 | Saadat |
| 2008/0033527 A1 | 2/2008 | Nunez et al. |
| 2008/0077016 A1 | 3/2008 | Sparks |
| 2008/0097227 A1 | 4/2008 | Zdeblick et al. |
| 2008/0177186 A1 | 7/2008 | Slater et al. |
| 2008/0275350 A1 | 11/2008 | Liao |
| 2008/0287800 A1 | 11/2008 | Furman |
| 2008/0294041 A1 | 11/2008 | Kassab |
| 2009/0007679 A1 | 1/2009 | Nunez |
| 2009/0009332 A1 | 1/2009 | Nunez |
| 2009/0011117 A1 | 1/2009 | Nunez |
| 2009/0024029 A1 | 1/2009 | Murashita |
| 2009/0024042 A1 | 1/2009 | Nunez |
| 2009/0024177 A1 | 1/2009 | Shuros et al. |
| 2009/0030291 A1 | 1/2009 | O'Brien |
| 2009/0036776 A1 | 2/2009 | Masuda et al. |
| 2009/0062684 A1 | 3/2009 | Gregersen et al. |
| 2009/0105799 A1 | 4/2009 | Hekmat et al. |
| 2009/0149766 A1 | 6/2009 | Shuros et al. |
| 2009/0177225 A1 | 7/2009 | Nunez et al. |
| 2009/0189741 A1 | 7/2009 | Rowland |
| 2009/0198293 A1 | 8/2009 | Cauller |
| 2009/0270729 A1* | 10/2009 | Corbucci ............ A61B 5/1076 600/484 |
| 2009/0299427 A1 | 12/2009 | Liu et al. |
| 2009/0306507 A1 | 12/2009 | Hyun et al. |
| 2010/0056922 A1 | 3/2010 | Florent |
| 2010/0063375 A1 | 3/2010 | Kassab et al. |
| 2010/0076398 A1 | 3/2010 | Scheurer et al. |
| 2010/0076543 A1 | 3/2010 | Melsherimer |
| 2010/0094328 A1 | 4/2010 | O'dea et al. |
| 2010/0113939 A1 | 5/2010 | Mashimo et al. |
| 2010/0121398 A1 | 5/2010 | Bjorling et al. |
| 2010/0168577 A1 | 7/2010 | Vezina |
| 2010/0222786 A1 | 9/2010 | Kassab |
| 2010/0262206 A1 | 10/2010 | Zdeblick et al. |
| 2010/0274217 A1 | 10/2010 | Da Silva et al. |
| 2010/0324432 A1 | 12/2010 | Bjorling et al. |
| 2011/0054333 A1 | 3/2011 | Hoffer |
| 2011/0105863 A1 | 5/2011 | Kroh |
| 2011/0144967 A1 | 6/2011 | Adirovich |
| 2011/0160844 A1 | 6/2011 | Haselby |
| 2011/0178383 A1 | 7/2011 | Kassab |
| 2011/0184301 A1 | 7/2011 | Holmstrom et al. |
| 2011/0201990 A1 | 8/2011 | Franano |
| 2011/0214898 A1 | 9/2011 | Huynh |
| 2011/0224582 A1 | 9/2011 | Spence |
| 2011/0265908 A1 | 11/2011 | Clerc et al. |
| 2011/0306867 A1 | 12/2011 | Gopinathan et al. |
| 2012/0016207 A1 | 1/2012 | Allen |
| 2012/0029598 A1 | 2/2012 | Zhao |
| 2012/0136385 A1 | 5/2012 | Cully |
| 2012/0197118 A1 | 8/2012 | Lisiecki et al. |
| 2012/0203090 A1 | 8/2012 | Min |
| 2012/0203113 A1 | 8/2012 | Skerl et al. |
| 2012/0291788 A1 | 11/2012 | Griswold et al. |
| 2012/0296222 A1 | 11/2012 | Griswold et al. |
| 2013/0030295 A1 | 1/2013 | Huennekens et al. |
| 2013/0041244 A1 | 2/2013 | Woias et al. |
| 2013/0041251 A1 | 2/2013 | Bailey et al. |
| 2013/0041269 A1 | 2/2013 | Stahmann et al. |
| 2013/0060139 A1 | 3/2013 | Richter |
| 2013/0073025 A1 | 3/2013 | Kassab |
| 2013/0085350 A1 | 4/2013 | Schugt et al. |
| 2013/0096409 A1 | 4/2013 | Hiltner et al. |
| 2013/0178750 A1 | 7/2013 | Sheehan et al. |
| 2013/0178751 A1 | 7/2013 | Min |
| 2013/0184545 A1 | 7/2013 | Blomqvist et al. |
| 2013/0211291 A1 | 8/2013 | Tran |
| 2013/0218054 A1 | 8/2013 | Sverdlik et al. |
| 2013/0222153 A1 | 8/2013 | Rowland et al. |
| 2013/0245469 A1 | 9/2013 | Yadav |
| 2013/0245745 A1 | 9/2013 | Vong et al. |
| 2013/0261655 A1 | 10/2013 | Drasler et al. |
| 2013/0274705 A1 | 10/2013 | Burnes et al. |
| 2013/0281800 A1 | 10/2013 | Saroka et al. |
| 2013/0296721 A1 | 11/2013 | Yadav et al. |
| 2013/0303914 A1 | 11/2013 | Hiltner et al. |
| 2013/0303915 A1* | 11/2013 | Barnard ............... A61B 8/5207 600/449 |
| 2013/0310820 A1 | 11/2013 | Fernandez et al. |
| 2013/0317359 A1 | 11/2013 | Wilson et al. |
| 2013/0324866 A1 | 12/2013 | Gladshtein |
| 2013/0331678 A1 | 12/2013 | Lading et al. |
| 2013/0338468 A1 | 12/2013 | Kassab |
| 2013/0345650 A1* | 12/2013 | Amirouche ........... A61M 35/10 604/305 |
| 2014/0028467 A1 | 1/2014 | Nagy |
| 2014/0051965 A1 | 2/2014 | Zdeblick et al. |
| 2014/0066738 A1 | 3/2014 | Kassab |
| 2014/0073935 A1 | 3/2014 | Rodriguez-Llorente |
| 2014/0084943 A1 | 3/2014 | Kroh |
| 2014/0088994 A1 | 3/2014 | Kroh |
| 2014/0094697 A1 | 4/2014 | Petroff et al. |
| 2014/0107768 A1 | 4/2014 | Venkatasubramanian |
| 2014/0155710 A1 | 6/2014 | Rowland |
| 2014/0155768 A1 | 6/2014 | Orion et al. |
| 2014/0155769 A1 | 6/2014 | White |
| 2014/0180118 A1 | 6/2014 | Stigall |
| 2014/0188011 A1 | 7/2014 | Wurster et al. |
| 2014/0200428 A1 | 7/2014 | Kassab |
| 2014/0236011 A1 | 8/2014 | Fan et al. |
| 2014/0243640 A1 | 8/2014 | O'Dea |
| 2014/0266935 A1 | 9/2014 | Tankiewicz |
| 2014/0275861 A1 | 9/2014 | Kroh |
| 2014/0276011 A1 | 9/2014 | Schmitt et al. |

(56) References Cited

U.S. PATENT DOCUMENTS

| | | |
|---|---|---|
| 2014/0276067 A1 | 9/2014 | Neasham |
| 2014/0276110 A1 | 9/2014 | Hoseit |
| 2014/0276121 A1 | 9/2014 | Kassab |
| 2014/0276191 A1 | 9/2014 | Kassab |
| 2014/0288085 A1 | 9/2014 | Yadav |
| 2014/0288459 A1 | 9/2014 | Yadav |
| 2014/0306807 A1 | 10/2014 | Rowland |
| 2014/0330143 A1 | 11/2014 | Kroh et al. |
| 2014/0350348 A1 | 11/2014 | Tee et al. |
| 2014/0371624 A1* | 12/2014 | Ziaie .................. A61B 5/036 600/561 |
| 2015/0031966 A1 | 1/2015 | Ward et al. |
| 2015/0045649 A1 | 2/2015 | O'Dea et al. |
| 2015/0051467 A1 | 2/2015 | Corbucci et al. |
| 2015/0065835 A1 | 3/2015 | Kassab |
| 2015/0065897 A1 | 3/2015 | Bornzin et al. |
| 2015/0088100 A1 | 3/2015 | Oborn |
| 2015/0133796 A1 | 5/2015 | Yadav |
| 2015/0141863 A1 | 5/2015 | Kassab et al. |
| 2015/0157268 A1 | 6/2015 | Winshtein et al. |
| 2015/0208929 A1 | 7/2015 | Rowland |
| 2015/0216425 A1 | 8/2015 | Gladshtein et al. |
| 2015/0223702 A1 | 8/2015 | Vanney et al. |
| 2015/0238121 A1 | 8/2015 | Tu et al. |
| 2015/0257732 A1 | 9/2015 | Ryan |
| 2015/0282720 A1 | 10/2015 | Goldstein et al. |
| 2015/0282875 A1 | 10/2015 | Harper et al. |
| 2015/0290373 A1 | 10/2015 | Rudser et al. |
| 2015/0297110 A1 | 10/2015 | Kassab |
| 2015/0297111 A1 | 10/2015 | Kassab |
| 2015/0297112 A1 | 10/2015 | Kassab et al. |
| 2015/0297113 A1 | 10/2015 | Kassab |
| 2015/0297818 A1 | 10/2015 | Matsubara et al. |
| 2015/0305808 A1 | 10/2015 | Ku et al. |
| 2015/0313479 A1 | 11/2015 | Stigall et al. |
| 2015/0327786 A1 | 11/2015 | Lading et al. |
| 2016/0000403 A1 | 1/2016 | Vilkomerson |
| 2016/0015507 A1 | 1/2016 | Johnson et al. |
| 2016/0022216 A1 | 1/2016 | Goldshtein et al. |
| 2016/0022447 A1 | 1/2016 | Kim et al. |
| 2016/0029956 A1 | 2/2016 | Rowland |
| 2016/0029995 A1 | 2/2016 | Navratil et al. |
| 2016/0038087 A1 | 2/2016 | Hunter |
| 2016/0045184 A1 | 2/2016 | Courtney |
| 2016/0064117 A1 | 3/2016 | Romero |
| 2016/0081657 A1 | 3/2016 | Rice |
| 2016/0095535 A1 | 4/2016 | Hettrick et al. |
| 2016/0135787 A1 | 5/2016 | Anderson et al. |
| 2016/0135941 A1 | 5/2016 | Binmoeller et al. |
| 2016/0166232 A1 | 6/2016 | Merritt |
| 2016/0198981 A1 | 7/2016 | Demir et al. |
| 2016/0199204 A1 | 7/2016 | Pung |
| 2016/0210846 A1 | 7/2016 | Rowland et al. |
| 2016/0324443 A1 | 11/2016 | Rowland et al. |
| 2016/0345930 A1 | 12/2016 | Mizukami |
| 2016/0354032 A1 | 12/2016 | Wariar |
| 2016/0374710 A1 | 12/2016 | Sinelnikov |
| 2017/0055048 A1 | 2/2017 | Nagy et al. |
| 2017/0055909 A1 | 3/2017 | Schibli et al. |
| 2017/0065186 A1 | 3/2017 | Joseph et al. |
| 2017/0065824 A1 | 3/2017 | Dagan et al. |
| 2017/0071501 A1 | 3/2017 | Kassab |
| 2017/0127975 A1 | 5/2017 | Bozkurt |
| 2017/0164840 A1 | 6/2017 | Matsumoto |
| 2017/0181677 A1 | 6/2017 | Varsavsky et al. |
| 2017/0216508 A1 | 8/2017 | Zilbershlag et al. |
| 2017/0224279 A1 | 8/2017 | Cahan et al. |
| 2017/0238817 A1 | 8/2017 | Lading |
| 2017/0290686 A1 | 10/2017 | Sirhan et al. |
| 2017/0319096 A1 | 11/2017 | Kaiser |
| 2017/0332945 A1 | 11/2017 | Gopinathan et al. |
| 2017/0340440 A1 | 11/2017 | Ratz |
| 2017/0360312 A1 | 12/2017 | Joseph |
| 2018/0014829 A1 | 1/2018 | Tal et al. |
| 2018/0064931 A1 | 3/2018 | Clements |
| 2018/0092631 A1 | 4/2018 | Liou |
| 2018/0132724 A1 | 5/2018 | Waechter-Stehle |
| 2018/0172785 A1 | 6/2018 | Leussler et al. |
| 2018/0177486 A1 | 6/2018 | Gifford et al. |
| 2018/0220992 A1 | 8/2018 | Gifford et al. |
| 2018/0228951 A1 | 8/2018 | Schwammenthal et al. |
| 2018/0247095 A1 | 8/2018 | Sundaram et al. |
| 2018/0268941 A1 | 9/2018 | Lavi et al. |
| 2018/0269931 A1 | 9/2018 | Hershko et al. |
| 2018/0271371 A1 | 9/2018 | Ziaie et al. |
| 2018/0289488 A1 | 10/2018 | Orth et al. |
| 2018/0289536 A1 | 10/2018 | Burnett |
| 2018/0293409 A1 | 10/2018 | Sundaram et al. |
| 2018/0326151 A1 | 11/2018 | Halpert et al. |
| 2018/0344917 A1 | 12/2018 | Inhaber et al. |
| 2019/0015013 A1 | 1/2019 | Zhu et al. |
| 2019/0029639 A1 | 1/2019 | Gifford et al. |
| 2019/0046047 A1 | 2/2019 | Haase |
| 2019/0053720 A1 | 2/2019 | Sawado |
| 2019/0053767 A1 | 2/2019 | Yamada |
| 2019/0059777 A1 | 2/2019 | Aga et al. |
| 2019/0069784 A1 | 3/2019 | Mukkamala |
| 2019/0069842 A1 | 3/2019 | Rothberg |
| 2019/0069851 A1 | 3/2019 | Sharma |
| 2019/0070348 A1 | 3/2019 | Frost |
| 2019/0076033 A1 | 3/2019 | Sweeney et al. |
| 2019/0082978 A1 | 3/2019 | Van der Horst |
| 2019/0083030 A1 | 3/2019 | Thakur |
| 2019/0090760 A1 | 3/2019 | Kinast |
| 2019/0090763 A1 | 3/2019 | Woerlee |
| 2019/0090856 A1 | 3/2019 | Van der Horst |
| 2019/0099087 A1 | 4/2019 | Cros |
| 2019/0099088 A1 | 4/2019 | Whinnett |
| 2019/0110696 A1 | 4/2019 | Benkowski |
| 2019/0126014 A1 | 5/2019 | Kapur et al. |
| 2019/0150884 A1 | 5/2019 | Maharbiz et al. |
| 2019/0167188 A1 | 6/2019 | Gifford et al. |
| 2019/0175035 A1 | 6/2019 | van der Horst et al. |
| 2019/0358393 A1 | 11/2019 | Marbet |
| 2020/0000364 A1 | 1/2020 | Doodeman et al. |
| 2020/0013510 A1 | 1/2020 | Despenic et al. |
| 2020/0022588 A1 | 1/2020 | Wariar et al. |
| 2020/0022589 A1 | 1/2020 | Banet et al. |
| 2020/0029829 A1 | 1/2020 | Banet et al. |
| 2020/0029857 A1 | 1/2020 | Rowland et al. |
| 2020/0030612 A1 | 1/2020 | Song et al. |
| 2020/0037888 A1 | 2/2020 | Thakur et al. |
| 2020/0037892 A1 | 2/2020 | Banet et al. |
| 2020/0046299 A1 | 2/2020 | An et al. |
| 2020/0069857 A1 | 3/2020 | Schwammenthal et al. |
| 2020/0121187 A1 | 4/2020 | Sarkar et al. |
| 2020/0129087 A1 | 4/2020 | Sweeney et al. |
| 2020/0146577 A1 | 5/2020 | Badie et al. |
| 2020/0170515 A1 | 6/2020 | Wen et al. |
| 2020/0170711 A1 | 6/2020 | Hendriks et al. |
| 2020/0187864 A1 | 6/2020 | Sharma |
| 2020/0187865 A1 | 6/2020 | Sharma et al. |
| 2020/0196876 A1 | 6/2020 | Minor et al. |
| 2020/0196899 A1 | 6/2020 | Higgins et al. |
| 2020/0196943 A1 | 6/2020 | Minor et al. |
| 2020/0196944 A1 | 6/2020 | Minor et al. |
| 2020/0196948 A1 | 6/2020 | Cho et al. |
| 2020/0197178 A1 | 6/2020 | Vecchio |
| 2020/0254161 A1 | 8/2020 | Schwammenthal et al. |
| 2020/0289257 A1 | 9/2020 | Marquez |
| 2020/0345246 A1 | 11/2020 | Hilgers et al. |
| 2021/0038094 A1 | 2/2021 | Sweeney et al. |
| 2021/0060298 A1 | 3/2021 | Arndt et al. |
| 2021/0113099 A1 | 4/2021 | Rogers et al. |
| 2021/0113194 A1 | 4/2021 | Padwal et al. |
| 2021/0177277 A1 | 6/2021 | Cros et al. |
| 2021/0216733 A1 | 7/2021 | Chronos et al. |
| 2021/0244381 A1 | 8/2021 | Sweeney et al. |
| 2021/0401306 A1 | 12/2021 | Sweeney |
| 2022/0071488 A1 | 3/2022 | Andersen et al. |
| 2022/0125312 A1 | 4/2022 | Nazari et al. |
| 2022/0193419 A1 | 6/2022 | Sarkar et al. |
| 2022/0233084 A1 | 7/2022 | Valdez |

(56) References Cited

U.S. PATENT DOCUMENTS

| | | |
|---|---|---|
| 2022/0240792 A1 | 8/2022 | Wetterling |
| 2022/0265157 A1 | 8/2022 | Charthad |
| 2024/0155147 A1 | 5/2024 | Sun et al. |

FOREIGN PATENT DOCUMENTS

| | | |
|---|---|---|
| CN | 110613449 B | 5/2020 |
| CN | 111867672 A | 10/2020 |
| DE | 102005035022 A1 | 11/2006 |
| EP | 0399059 A1 | 5/1989 |
| EP | 0538885 A1 | 4/1993 |
| EP | 0897285 A1 | 2/1999 |
| EP | 1162914 A1 | 12/2001 |
| EP | 1311210 A2 | 5/2003 |
| EP | 0904009 B1 | 9/2003 |
| EP | 1545303 A2 | 6/2005 |
| EP | 1677852 A2 | 7/2006 |
| EP | 1847217 A2 | 10/2007 |
| EP | 1851524 A2 | 11/2007 |
| EP | 1851791 A2 | 11/2007 |
| EP | 1868496 A2 | 12/2007 |
| EP | 1871224 A2 | 1/2008 |
| EP | 1893080 A2 | 3/2008 |
| EP | 1893081 A2 | 3/2008 |
| EP | 1893085 A2 | 3/2008 |
| EP | 2091426 A2 | 6/2008 |
| EP | 1948007 | 7/2008 |
| EP | 1993438 A1 | 11/2008 |
| EP | 2012658 A2 | 1/2009 |
| EP | 2046242 A2 | 4/2009 |
| EP | 2117423 A2 | 11/2009 |
| EP | 2197344 A1 | 6/2010 |
| EP | 2265164 A1 | 12/2010 |
| EP | 2021757 B1 | 4/2011 |
| EP | 2391263 A2 | 12/2011 |
| EP | 1921983 B1 | 1/2012 |
| EP | 2060014 B1 | 1/2012 |
| EP | 1902529 B1 | 6/2012 |
| EP | 1876945 B1 | 12/2012 |
| EP | 2330968 B1 | 4/2013 |
| EP | 2601633 A2 | 6/2013 |
| EP | 2449960 B1 | 10/2013 |
| EP | 2725969 A1 | 5/2014 |
| EP | 1993436 B1 | 6/2014 |
| EP | 3027109 A1 | 2/2015 |
| EP | 2076170 B1 | 4/2015 |
| EP | 2895059 A1 | 7/2015 |
| EP | 2898470 A1 | 7/2015 |
| EP | 2922465 A1 | 9/2015 |
| EP | 2317912 B1 | 11/2015 |
| EP | 1817593 B1 | 12/2015 |
| EP | 2967432 A2 | 1/2016 |
| EP | 2268218 B1 | 2/2016 |
| EP | 2456502 B1 | 4/2016 |
| EP | 2702578 B1 | 8/2016 |
| EP | 3057075 A1 | 8/2016 |
| EP | 2417590 B1 | 5/2017 |
| EP | 2986252 B1 | 7/2018 |
| EP | 3359021 A1 | 8/2018 |
| EP | 3435847 A1 | 2/2019 |
| EP | 3435862 A1 | 2/2019 |
| EP | 3437000 A1 | 2/2019 |
| EP | 3448330 A1 | 3/2019 |
| EP | 3448487 A2 | 3/2019 |
| EP | 3457911 A1 | 3/2019 |
| EP | 3457924 A1 | 3/2019 |
| EP | 3457928 A1 | 3/2019 |
| EP | 3463082 A1 | 4/2019 |
| EP | 3468462 A1 | 4/2019 |
| EP | 3591663 A1 | 1/2020 |
| EP | 3609392 A1 | 2/2020 |
| EP | 3256043 B1 | 3/2020 |
| EP | 3629921 A1 | 4/2020 |
| EP | 3629937 A1 | 4/2020 |
| EP | 3630275 A1 | 4/2020 |
| EP | 3634206 A1 | 4/2020 |
| EP | 3654835 A1 | 5/2020 |
| EP | 3496808 B1 | 6/2020 |
| EP | 2654560 B1 | 7/2020 |
| EP | 3326524 B1 | 7/2020 |
| EP | 3367884 B1 | 7/2020 |
| EP | 3678539 A1 | 7/2020 |
| EP | 3681389 A1 | 7/2020 |
| EP | 3684260 A1 | 7/2020 |
| EP | 3684464 A1 | 7/2020 |
| EP | 2155307 B1 | 3/2021 |
| EP | 4039173 A1 | 8/2022 |
| FR | 3119090 A1 | 7/2022 |
| GB | 2473529 A | 3/2011 |
| JP | 2011234884 A | 11/2011 |
| JP | 2024516492 A | 4/2024 |
| WO | 1997042871 A1 | 11/1997 |
| WO | 1998029030 A1 | 12/1997 |
| WO | 1998035611 A1 | 8/1998 |
| WO | 2000055579 A2 | 9/2000 |
| WO | 2000056210 A1 | 9/2000 |
| WO | 2001012092 A1 | 2/2001 |
| WO | 2001013792 A1 | 3/2001 |
| WO | 2002015823 A2 | 2/2002 |
| WO | 2002076289 A2 | 10/2002 |
| WO | 2003061467 A1 | 7/2003 |
| WO | 2003061504 A1 | 7/2003 |
| WO | 2003092495 A1 | 11/2003 |
| WO | 2004073796 A1 | 9/2004 |
| WO | 2014188430 A2 | 11/2004 |
| WO | 2006049796 A2 | 5/2006 |
| WO | 2006086113 A2 | 8/2006 |
| WO | 2006086114 A2 | 8/2006 |
| WO | 2005027998 A2 | 9/2006 |
| WO | 2006094273 A2 | 9/2006 |
| WO | 2006096582 A1 | 9/2006 |
| WO | 2006102905 A1 | 10/2006 |
| WO | 2006110798 A2 | 10/2006 |
| WO | 2006025215 A2 | 11/2006 |
| WO | 2006125215 A2 | 11/2006 |
| WO | 2007002185 A2 | 1/2007 |
| WO | 2007002224 A2 | 1/2007 |
| WO | 2007002225 A2 | 1/2007 |
| WO | 2007008493 A1 | 1/2007 |
| WO | 2007028035 A2 | 3/2007 |
| WO | 2007035332 A1 | 3/2007 |
| WO | 2007047571 A2 | 4/2007 |
| WO | 2007047794 A2 | 4/2007 |
| WO | 2007061841 A2 | 5/2007 |
| WO | 2007106490 A2 | 9/2007 |
| WO | 2007106533 A1 | 9/2007 |
| WO | 2007130628 A2 | 11/2007 |
| WO | 2008031011 A1 | 3/2008 |
| WO | 2008031095 A1 | 3/2008 |
| WO | 2008051907 A1 | 5/2008 |
| WO | 2008066569 A2 | 6/2008 |
| WO | 2009006602 A1 | 1/2009 |
| WO | 2009006608 A1 | 1/2009 |
| WO | 2009006610 A1 | 1/2009 |
| WO | 2009006615 A1 | 1/2009 |
| WO | 2009025648 A1 | 2/2009 |
| WO | 2009039174 A1 | 3/2009 |
| WO | 2009111255 A1 | 9/2009 |
| WO | 2009131879 A1 | 10/2009 |
| WO | 2011060359 A2 | 11/2009 |
| WO | 2009146089 A2 | 12/2009 |
| WO | 2009146090 A2 | 12/2009 |
| WO | 2009149462 A2 | 12/2009 |
| WO | 2010011612 A1 | 1/2010 |
| WO | 2010088279 A2 | 8/2010 |
| WO | 2010117597 A1 | 10/2010 |
| WO | 20100117356 A1 | 10/2010 |
| WO | 2011011104 A1 | 1/2011 |
| WO | 2012015954 A1 | 2/2012 |
| WO | 2012015955 A1 | 2/2012 |
| WO | 2012019191 A2 | 2/2012 |
| WO | 2012090206 A2 | 7/2012 |
| WO | 2012140147 A3 | 10/2012 |
| WO | 2012145187 A1 | 10/2012 |

(56) References Cited

FOREIGN PATENT DOCUMENTS

| | | |
|---|---|---|
| WO | 2012149008 A2 | 11/2012 |
| WO | 2013003754 A1 | 1/2013 |
| WO | 2013142387 A1 | 9/2013 |
| WO | 2013163605 A1 | 10/2013 |
| WO | 2014006471 A2 | 1/2014 |
| WO | 2014012670 A1 | 1/2014 |
| WO | 2004014456 A2 | 2/2014 |
| WO | 2014047528 A1 | 3/2014 |
| WO | 2014054045 A1 | 4/2014 |
| WO | 2014070316 A1 | 5/2014 |
| WO | 2014076620 A2 | 5/2014 |
| WO | 2014081958 A1 | 5/2014 |
| WO | 2014145531 A1 | 9/2014 |
| WO | 2014145712 A1 | 9/2014 |
| WO | 2014162181 A2 | 10/2014 |
| WO | 2014170771 A1 | 10/2014 |
| WO | 2014179739 A1 | 11/2014 |
| WO | 2014197101 A1 | 12/2014 |
| WO | 2015074018 A1 | 5/2015 |
| WO | 2015109028 A1 | 7/2015 |
| WO | 20150157712 A2 | 10/2015 |
| WO | 2016011309 A2 | 1/2016 |
| WO | 2016025430 A1 | 2/2016 |
| WO | WO-2016039761 A1 * | 3/2016 ........... A61B 5/0066 |
| WO | 2016131020 A1 | 8/2016 |
| WO | 2016156446 A1 | 10/2016 |
| WO | 2016178196 A2 | 11/2016 |
| WO | 2016178197 A1 | 11/2016 |
| WO | 2017024051 A1 | 2/2017 |
| WO | 2017143198 A1 | 8/2017 |
| WO | 2017198867 A1 | 11/2017 |
| WO | 2017200956 A1 | 11/2017 |
| WO | 2017222964 A1 | 12/2017 |
| WO | 2018013725 A1 | 1/2018 |
| WO | 2018031714 A1 | 2/2018 |
| WO | 2018081314 A1 | 5/2018 |
| WO | 2018102435 A1 | 6/2018 |
| WO | 2018146690 A1 | 8/2018 |
| WO | 2018150314 A1 | 8/2018 |
| WO | 2018156930 A1 | 8/2018 |
| WO | 2018187582 A1 | 10/2018 |
| WO | 2018220143 A1 | 12/2018 |
| WO | 2018220146 A1 | 12/2018 |
| WO | 2019050831 A1 | 3/2019 |
| WO | 2019051007 A1 | 3/2019 |
| WO | 2019051108 A1 | 3/2019 |
| WO | 2019051007 A8 | 4/2019 |
| WO | 2019063521 A1 | 4/2019 |
| WO | 2019079364 A1 | 4/2019 |
| WO | 2019101855 A1 | 5/2019 |
| WO | 2019232213 A1 | 12/2019 |
| WO | 2020023839 A1 | 1/2020 |
| WO | 2020121221 A1 | 6/2020 |
| WO | 2020131247 A1 | 6/2020 |
| WO | 2020132460 A1 | 6/2020 |
| WO | 2020132668 A2 | 6/2020 |
| WO | 2020132669 A1 | 6/2020 |
| WO | 2020132670 A1 | 6/2020 |
| WO | 2020132671 A1 | 6/2020 |
| WO | 2020132678 A1 | 6/2020 |
| WO | 2020144075 A1 | 7/2020 |
| WO | 2020153765 A2 | 7/2020 |
| WO | 2021217055 A1 | 10/2021 |
| WO | 2021236756 A1 | 11/2021 |
| WO | 2022055920 A1 | 3/2022 |
| WO | 2022167382 A1 | 8/2022 |

OTHER PUBLICATIONS

International Search Report and Written Opinion dated Aug. 29, 2018, in connection with PCT/EP2018/064386.
International Search Report and Written Opinion dated Aug. 21, 2018, in connection with PCT/EP2018/064383.
Voroneanu et. al., "The relationship between chronic volume overload 3 and elevated blood pressure in hemodialysis patients: 4 use of bioimpedance provides a different perspective 5 from echocardiography and biomarker methodologies," Int Urol Nephrol, 2010, Sep. 42(3):789-97.
Cannesson et al., "Respiratory Variations in Pulse Oximetry Plethysmographic Waveform Amplitude to Predict Fluid Responsiveness in the Operating Room," Anesthesiology 2007; 106:1105-11.
Abraham et al., "The Role of Implantable Hemodynamic Monitors to Manage Heart Failure," Heart Failure Clin 11 (2015) 183-189.
Tallaj et al., "Implantable Hemodynamic Monitors," Cardiol Clin 29 (2011) 289-299.
Tang et al., "Measuring impedance in congestive heart failure: Current options and clinical applications," American Heart Journal 157 (3) 402-411.
Merchant et al., "Implantable Sensors for Heart Failure," Circulation: Arrhythmia and Electrophysiology. 2010; 3: 657-667.
Unadkat, Jignesh V., et al. "The Development of a Wireless Implantable Blood Flow Monitor," Ideas and Innovations, American Society of Plastic Surgeons, 136:199 (2015).
Steinhouse, David et al., "Implant Experience with an Implantable Hemodynamic Monitor for the Management of Symptomatic Heart Failure," PACE (Aug. 2005) vol. 28, pp. 747-753.
Braunschweig, Frieder et al. "Dynamic changes in right ventricular pressures during haemodialysis recorded with an implantable haemodynamic monitor," Nephrol Dial Transplant (2006) 21:176-183.
Karamanoglu, Mustafa et al., "Estimation of cardiac output in patients with congestive heart failure by analysis of right ventricular pressure waveforms," BioMedical Engineering OnLine 2011, 10:36.
Spiliopoulos, Sotirios et la., "Beneficial aspects of real time flow measurements for the management of acute right ventricular heart failure following continuous flow ventricular assist device implantation," Journal of Cardiothoracic Surgery (2012) 7:119.
Sharma, Arjun D. et al., "Right Ventricular Pressure During Ventricular Arrhythmias in Humans: Potential Implications for Implantable Antitachycardia Devices," JACC vol. 15, No. 3, Mar. 1, 1990, pp. 648-655.
Kjellstrom, Barbo et al., "Changes in Right Ventricular Pressures Between Hemodialysis Sessions Recorded by an Implantable Hemodynamic Monitor," The American Journal of Cardiology, 2009, 103:119-123.
Zile, Michael R. et al., "Transition From Chronic Compensated to Acute Decompensated Heart Failure," Circulation, American Heart Association (2008) 118:1433-1441.
Plicchi, G. et al., "Pea I and Pea II Based Implantable Haemodynamic Monitor: Pre Clinical Studies in Sheep," Europace (2002) 4, 49-54.
Vanderheyden, Marc et al., "Continuous Monitoring of Intrathoracic Impedance and Right Ventricular Pressures in Patients With Heart Failure," Circulation Heart Failure (2010) 3:370-377.
Jacobs, Donald L. et al., "Bedside vena cava filter placement with intravascular ultrasound: A simple, accurate, single venous access method," Technical Note, Journal of Vascular Surgery, vol. 46, No. 6, pp. 1284-1286, Dec. 2007.
Muller, Laurent et al., "Respiratory variations of inferior vena cava diameter to predict fluid responsiveness in spontaneously breathing patients with acute circulatory failure: need for a cautious use," Critical Care 2012, 16:R188.
Blehar, David J. et al., "Identification of congestive heart failure via respiratory variation of inferior vena cava diameter." American Journal of Emergency Medicine (2009) 27, 71-75.
Miller, Joseph B., et al., "Inferior vena cava assessment in the bedside diagnosis of acute heart failure," American Journal of Emergency Medicine (2012) 30, 778-783.
Corl, Keith et al., "Bedside sonographic measurement of the inferior vena cava caval index is a poor predictor of fluid responsiveness in emergency department patients," Emergency Medicine Australasia (2012) 24, 534-539.
Feissel, et al. "The respiratory variation in inferior vena cava diameter as a guide to fluid therapy," Intensive Care Med (2004) 30: 1834-1837.

(56) References Cited

OTHER PUBLICATIONS

Nakao, Shoichiro et al., "Effects of Positional Changes on Inferior Vena Caval Size and Dynamics and Correlations with Right-Sided Cardiac Pressure," American Journal of Cardiology (1987; 59:125-132).
Saha, Narayan M., et al., "Outpatient Use of Focused Cardiac Ultrasound to Assess the Inferior Vena Cava in Patients With Heart Failure," American Journal of Cardiology (2015).
Ishizaki, et al. "Measurement of inferior vena cava diameter for evaluation of venous return in subjects on day 10 of a bed-rest experiment," J Appl Physical 96: 2179-2186, 2004.
Carbone et al. "Inferior Vena Cava Parameters Predict Re-admission in Ischaemic Heart Failure", European Journal of Clinical Investigations, 2014, 44(4): 341-349.
Bertram, C.D. et al., "Cross-sectional area measurement in collapsed tubes using the transformer principle", Med. & Biol, Eng. & Comput, 1989, 27, 357-364.
Moreno, Augusto et al., "Mechanics of Distension of Dog Veins and Other Very Thin-Walled Tubular Structures", Circulation Research, vol. XXVII, Dec. 1970, pp. 1069-1080.
Tafur, Emilio et al., "Simultaneous Pressure, Flow and Diameter of the Vena Cava with Fright and Exercise", Circulation Research, vol. XIX, Jul. 1966., pp. 42-50.
Guntheroth, Warren G., et al., "Effect of Respiration on Venous Return and Stroke Volume in Cardiac Tamponade", Circulation Research, vol. XX, Apr. 1967, pp. 381-390.
Bartels, Lambertus et al., "Improved Lumen Visualization in Metallic Vascular Implants by Reducing RF Artifacts", Magnetic Resonance in Medicine 47:171-180 (2002).
Guntheroth, Warren G., "in Vivo Measurement of Dimensions of Veins with Implications Regarding Control of Venous Return", IEEE Transactions on Bio-Medical Engineering, Oct. 1969; pp. 247-253.
Kivelitz, Dietmar et al., "A Vascular Stent as an Active Component for Locally Enhanced Magnetic Resonance Imaging", Investigative Radiology, vol. 38, No. 3, 147-152 (2003).
Reddy, Reddy R.V., et al., "A Catheter-Tip Probe for Dynamic Cross-Section Area Measurement", pp. 149-158. (1973).
Stegall, H. Fred, "Survey of Dimension Transducers", Chronically Implanted Cardiovascular Instrumentation, pp. 107-115 (1973).
D. H. Bergel, "The Measurement of Lengths and Dimensions", Cardiovascular Fluid Dynamics, vol. 1. pp. 91-114 (1972).
Baan, Jan et al., "Dynamic Local Distensibility of Living Arteries and its relation to Wave Transmission", Biophysical Journal, vol. 14, (1974); pp. 343-362.
International Search Report and Written Opinion in connection with PCT/US2016/017902, dated Jul. 27, 2016.
Reems, Miryam et al., Central Venous Pressure: Principles, Measurement, and Interpretation, Vetlearn.com, Jan. 2012, Compendium: Continuing Education for Veterinarians, pp. E1-E10.
Yamauchi, Hideko et al., "Correlation Between Blood Volume and Pulmonary Artery Catheter Measurements", Department of Surgery and Surgical Critical Care, University of Hawaii, 2005.
Abraham, William T. et al., "Wireless pulmonary artery haemodynamic monitoring in chronic heart failure: a randomised controlled trial"; www.thelancet.com, vol. 377, Feb. 19, 2011, pp. 658-666.
Guiotto, Giovanna et al., "Inferior vena cava collapsibility to guide fluid removal in slow continuous ultrafiltration: a pilot study", Intensive Care Med (2010) 36:696-696.
Martens, Pieter et al., "Current Approach to Decongestive Therapy in Acute Heart Failure", Curr Heart Fail Rep (2015) 12:367-378.
Dupont, Matthias et a., "Impact of Systemic Venous Congestion in Heart Failure", Curr Heart Fail Rep (2011) 8:233-241.
Marik, Paul E. et al., "Hemodynamic parameters to guide fluid therapy", Annals of Intensive Care 2011, 1:1; http://www.annalsofintensivecare.com/content/1/1/1.
Silverberg, Donald et al., "The association between congestive heart failure and chronic renal disease", Curr Opin Nephrol Hypertens 13: 163-170, 2004.

International Search Report and Written Opinion dated Feb. 27, 2020, in connection with PCT/IB2019/060669 filed Dec. 11, 2019.
International Search Report and Written Opinion dated Mar. 3, 2020, in connection with PCT/US2019/066589 filed Dec. 16, 2019.
Extended European Search Report dated Jul. 3, 2020, in connection with EP20163433.4.
Extended European Search Report dated Sep. 16, 2020, in connection with EP Application No. 20178613.4, filed Nov. 29, 2017.
International Search Report and Written Opinion dated Oct. 19, 2017, in connection with PCT/US2017/046204.
Brennan, J.M., "Handcarried Ultrasound Measurement of the Inferior Vena Cava for Assessment of Intravascular vol. Status in the Outpatient Hemodialysis Clinic"; Clinical Journal of the American Society of Nephrology; pp. 749-753; Jan. 23, 2006.
International Search Report and Written Opinion dated Oct. 20, 2016, in connection with PCT/US2016/045385 filed Aug. 3, 2016.
ISR Report and Written Opinion dated Dec. 30, 2020, in connection with PCT/EP2020/067713 filed on Jun. 24, 2020.
International Search Report and Written Opinion dated Nov. 4, 2019, in connection with PCT/US2019/034657, filed May 30, 2019.
International Search Report and Written Opinion dated Feb. 18, 2021, in connection with PCT/IB2020/060669, filed Nov. 12, 2020.
International Search Report and Written Opinion dated Jan. 19, 2021, in connection with PCT/EP2020/079939, filed Oct. 23, 2020.
Horizon Scanning Research & Intelligence Centre; Furosemide sc2Wear micro-pump patch for oedema in heart failure; National Institute for Health Research; NIHR HSRIC ID: 11808; Mar. 2016; pp. 1-10; www.hsric.nihr.ac.uk.
Lee et al, "Prognostic significance of dilated inferior vena cava in advanced decompensated heart failure" International Journal of Cardiovascular Imaging (2014) 30:1289-1295.
Sonoo T, et. Al., "Prospective analysis of cardiac collapsibility of inferior vena cava using ultrasonography", J Crit Care 2015, http://dx.doi.org/10.1016/j.jcrc.2015.04.124.
Marik, et al., Does Central Venous Pressure Predict Fluid Responsiveness?*: A Systematic Review of the Literature and the Tale of Seven Mares, Chest (2008) 134(1):172-178.
Blehar, et al., Inferior vena cava displacement during respirophasic ultrasound imaging, Critical Ultrasound Journal (2012) 4:18.
Huguet et al., Three-Dimensional Inferior Vena Cava for Assessing Central Venous Pressure in Patients with Cardiogenic Shock, J Am Soc Echocardiogr. 2018; 31: 1034-43 (https://doi.org/10.1016/j.echo.2018.04.003).
Katzarski et al. "A Critical Evaluation of Ultrasound Measurement of Inferior Vena Cava Diameter in Assessing Dry Weight in Normotensive and Hypertensive Hemodialysis Patients," AJKD, vol. 30, No. 4, Oct. 1997, pp. 459-465.
Hellevik et al. Heart Vessels v13, No. 4, p. 175-180, Jul. 1998.
Minten et. al. Cardiovasc. Res, vol. 17, No. 10, pp. 627-632, Oct. 1983.
Dehkordi et al., Extracting Instantaneous Respiratory Rate From Multiple Photoplethysmogram Respiratory-Induced Variations; Frontiers in Physiology, vol. 9,Article 948; Jul. 18, 2018 (DOI: 10.3389/fphys.2018.00948).
Yates PhD dissertation, Stanford CA, SUDAAR 393 1969.
Miles et al "Peripheral Intravenous Volume Analysis (PIVA) for Quantitating Volume Overload in Patients Hospitalized With Acute Decompensated Heart Failure—A Pilot Study"; Journal of Cardiac Failure; 2018; https://doi.org/10.1016/j.cardfail.2018.05.003.
Reymond et al., Validation of a one-dimensional model of the systemic arterial tree Proceedings of the ASME 2009 Summer Bioengineering Conference (SBC2009); SBC2009-206424.
Rudski et al, Guidelines for the Echocardiographic Assessment of the Right Heart in Adults: A Report from the American Society of Echocardiography (J AM Soc Echocard 2010, 23: 685-713).
Wang et al., "Internal jugular vein ultrasound for the diagnosis of hypovolemia and hypervolemia in acutely ill adults; a systematic review and meta-analysis"; Internal and Emergency Medicine (2022) 17:1521-1532, Feb. 27, 2022.
Nippa et al., "Pulse wave velocity in human veins"; Journal of Applied Physiology, vol. 30, No. 4, Apr. 1971.

(56) References Cited

OTHER PUBLICATIONS

Peters et al.; "Inductance calculation of planar multi-layer and multi-wire coils: An analytical appraoch"; Sensors and Actuators A 145-146; pp. 394-404; Nov. 17, 2007.
Stergiopulos et al. "Simple and accurate way for estimating total and segmental arterial compliance: The pulse pressure method" Ann Biomed Eng 22, 392-397 (1994).

* cited by examiner

PATIENT FLUID MANAGEMENT SYSTEMS AND METHODS EMPLOYING INTEGRATED FLUID STATUS SENSING

RELATED APPLICATIONS

The present application claims priority to U.S. Provisional Application No. 63/017,958, filed on Apr. 30, 2020, and entitled "Patient Fluid Management Systems and Methods Employing Integrated Fluid Status Sensing."

The present application is also a continuation-in-part application of U.S. Continuation patent application Ser. No. 16/271,798, filed Feb. 9, 2019, and entitled "Systems and Methods for Patient Fluid Management", which is a continuation of PCT/US2017/046204, filed Aug. 10, 2017, which application claims priority to U.S. Provisional Patent Application No. 62/534,329, filed Jul. 19, 2017, and entitled "Wireless Vascular Monitoring Implants, Systems and Methods"; U.S. Provisional Patent Application No. 62/427,631, filed Nov. 29, 2016, and entitled "Wireless Vascular Monitoring Implants, Systems, Methods, and Software"; and U.S. Provisional Patent Application No. 62/373,436, filed Aug. 11, 2016, and entitled "Methods and Systems For Patient Fluid Management".

The present application is also a continuation-in-part application of U.S. Continuation patent application Ser. No. 17/162,857, filed Jan. 29, 2021, and entitled "Patient Self-Monitoring of IVC Volume for Early Heart Failure Warning Signs"; which is a continuation of U.S. Nonprovisional patent application Ser. No. 15/549,042 filed Aug. 4, 2017, and entitled "Implantable Devices and Related Methods for Heart Failure Monitoring" (now U.S. Pat. No. 10,905,393 granted Feb. 2, 2021); which application was a U.S. National Phase Application of PCT/US2016/017902 filed Feb. 12, 2016; which application claimed priority to U.S. Provisional Patent Application No. 62/172,516 filed Jun. 8, 2015, and entitled "Methods and Apparatus for Monitoring Patient Physiological Status Based on Inferior Vena Cava Volume"; U.S. Provisional Application No. 62/157,331 filed May 5, 2015, and entitled "Heart Failure Monitoring System and Method"; and U.S. Provisional Patent Application No. 62/115,435 filed Feb. 12, 2015, and entitled "Implantable Devices and Related Methods for Heart Failure Monitoring".

Each of these applications is incorporated herein by reference in its entirety.

FIELD

The present disclosure relates generally to therapy systems and methods for modulating patient fluid volume, and more specifically to patient fluid management systems and methods employing integrated fluid status sensing.

BACKGROUND

Many medical treatment systems employed to treat a variety of health-related problems incorporate or rely on information about patient fluid status as a parameter in modulating treatment. Examples of such treatment systems include, but are not necessarily limited to, dialysis systems, ultra-filtration systems, diuresis systems, left ventricular assist devices (LVAD), renal flow modulating systems, and active drainage systems. Operation of other devices, such as drug pumps and nerve stimulation devices may also be modulated more accurately with accurate patient fluid status information.

SUMMARY

In one implementation, the present disclosure is directed to an integrated patient fluid management system. The system includes an interventional device configured to effect a change in patient fluid state by delivery of an interventional therapy; a vascular dimension monitoring sensor configured to be positioned within a vascular lumen and to monitor changes in dimension of the vascular lumen resulting from changes in patient fluid state; and a control system configured to (i) communicate with the interventional device and the vascular dimension monitoring sensor and (ii) modulate the delivered interventional therapy in response to vascular dimension measurements as determined by the vascular dimension monitoring sensor.

In another implementation, the present disclosure is directed to an integrated patient fluid management system with assisted diuresis. The system includes a wireless implantable vascular dimension sensor monitor configured to be positioned within a vascular lumen to monitor changes in dimension of the vascular lumen resulting from changes in patient fluid state; processor-controlled infusion pump configured to deliver an interventional therapy comprising delivering at least one of a diuretic or an infusate to the patient through an infusion line in accordance with infusion rate and limit instructions set by the processor control; and a fluid status monitoring and infusion control system comprising a user interface, at least one processor, and memory, configured to: wirelessly communicate with the wireless implantable vascular dimension sensor and receive a signal therefrom indicative of changes in the monitored vascular dimension; derive current patient fluid state information from the received signals; receive a desired fluid loss goal input through the user interface and store desired fluid loss goal information in the memory; compare the current patient fluid state information with the fluid loss goal information to determine the interventional therapy directed to achieve the desired fluid loss goal; and instruct the processor-controlled infusion pump to deliver the interventional therapy to the patient at an infusion rate and limit set by the control system based on the comparison of current patient fluid state information with the fluid loss goal information.

In yet another implementation, the present disclosure is directed to an integrated patient fluid management method. The method includes setting a desired fluid loss goal by inputting the desired fluid loss goal into a system controller comprising a processor and memory; monitoring changes in dimension of a vascular lumen resulting from changes in patient fluid state using a wireless vascular dimension monitoring sensor implanted within the vascular lumen; determining changes in patient fluid status by wirelessly receiving and interpreting a signal from the vascular dimension monitoring sensor; administering a diuretic to the patient; and automatically administering a fluid to the patient by an infusion pump under control of the system controller until the desired fluid loss goal is reached.

BRIEF DESCRIPTION OF DRAWINGS

For the purpose of illustrating the disclosure, the drawings show aspects of one or more embodiments of the disclosure. However, it should be understood that the present disclosure is not limited to the precise arrangements and instrumentalities shown in the drawings, wherein.

DETAILED DESCRIPTION

Figure 1:
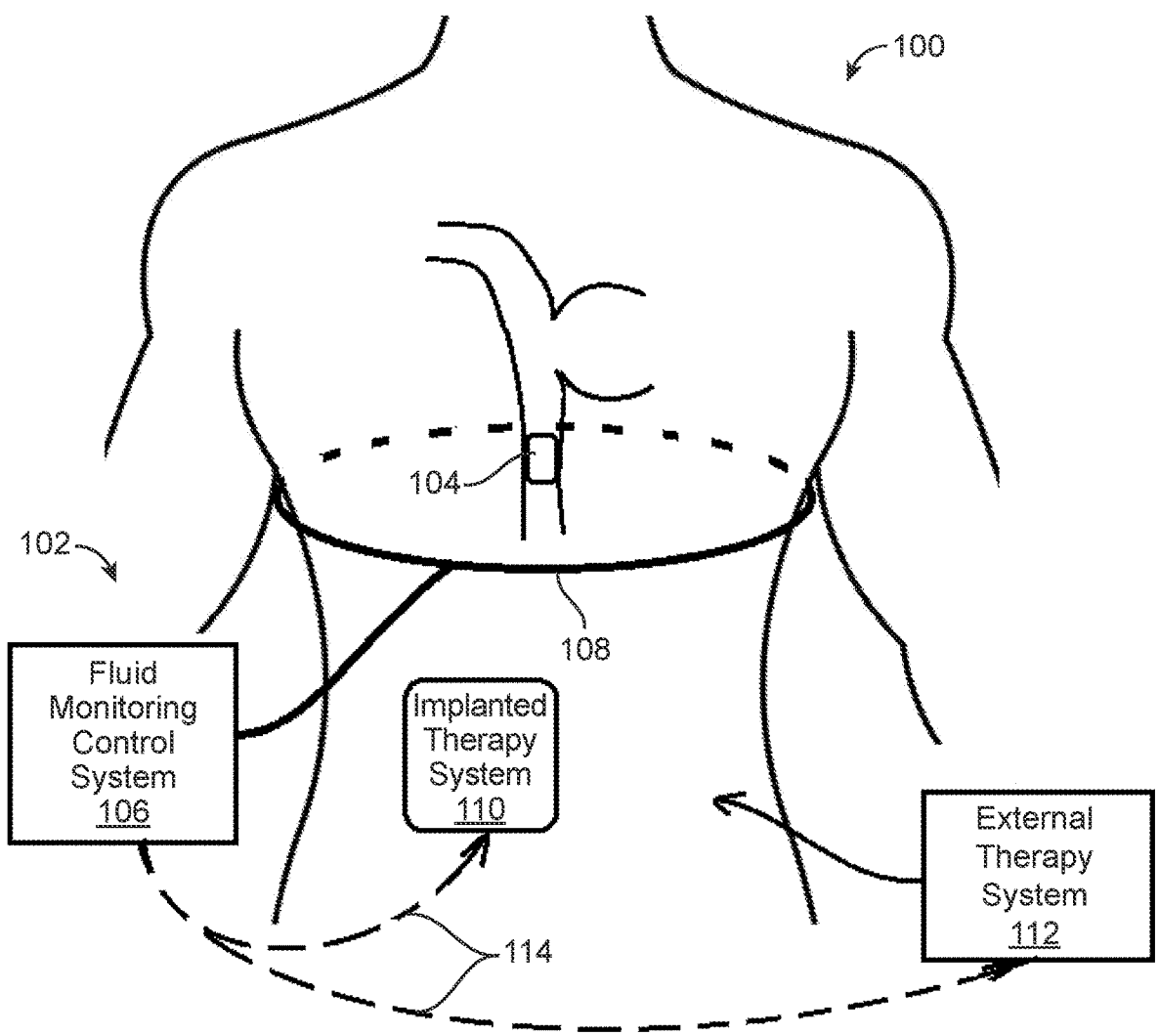
FIG. 1 is a schematic depiction of generic systems of the present disclosure.

The present Applicant has previously developed and disclosed a number of different implantable, wireless sensors for determining patient fluid status based on direct measurement of a vascular dimension, which indicates geometry, namely cross-sectional area and distension or collapse of the vessel. This measurement of vessels, particularly of the inferior vena cava (IVC), has been demonstrated to relate directly to a patient's circulating blood volume. Therefore such measurements with these sensors can be used to estimate a patient's circulating blood volume. In particular, these sensors can be used to determine whether circulating blood volume is too high or too low, and whether circulating blood volume is increasing or decreasing.

Such implantable sensors are capable of long-term placement suitable for monitoring patients with chronic conditions. Examples of such implantable, wireless sensors are disclosed, for example, in U.S. patent application Ser. No. 15/549,042, filed Aug. 4, 2017 (U.S. Pat. No. 10,905,393, granted Feb. 2, 2021), and entitled "Implantable Devices and Related Methods for Heart Failure Monitoring" and U.S. patent application Ser. No. 16/177,183, filed Oct. 31, 2018 (U.S. Pat. No. 10,806,352, granted Oct. 20, 2020) and entitled "Wireless Vascular Monitoring Implants," each of which is incorporated herein in its entirety. In other clinical situations, such as shorter term acute condition monitoring and in-hospital treatments, vascular dimension sensors for direct fluid state determination and monitoring may be catheter-based. Examples of such catheter-based sensors are disclosed, for example, in U.S. patent application Ser. No. 15/750,100, filed Feb. 2, 2018 (U.S. Publication No. US20180220992, published Aug. 9, 2018) and entitled "Devices and Methods for Measurement of Vena Cava Dimensions, Pressure and Oxygen Saturation," which is incorporated by reference in its entirety herein.

The present Applicant has also developed a new dialysis and other treatment systems to provide improved control and new treatment modalities based on and incorporating sensors as disclosed in the above-mentioned incorporated disclosures. Embodiments of such new systems are disclosed, for example, in U.S. patent application Ser. No. 16/271,798, filed Feb. 9, 2019 (US20190167188, published Jun. 6, 2019) and entitled "Systems and Methods for Patient Fluid Management" and International Patent Application No. PCT/IB2019/060669, filed Dec. 11, 2019 (WO2020/121221, published Jun. 18, 2020) and entitled "Dialysis Catheters with Integrated Fluid Status Sensing and Related Systems and Methods," each of which is incorporated by reference in its entirety herein.

The present disclosure provides additional embodiments and details of further systems based on and employing the new sensor devices as described above so as to offer new treatment modalities and possibilities for enhanced patient outcomes through optimized or new treatments. The disclosed sensors, hereinafter referred to as Fluid Status Monitoring Devices or Systems, provide an accurate, early, real-time estimation of circulating blood volume. This metric provides valuable information that is integrated into specific treatment systems as described herein in order to optimize performance and, in some cases, provide new treatment modalities or possibilities. As described in detail in the incorporated prior disclosures, the disclosed Fluid Status Monitoring Devices and Systems include a number of different and varied new embodiments incorporating sensing means, such as passive sensors excited by an external reader and hardware that (locally/in the cloud) could compute results and then input into other systems, or active sensors powered locally that could then communicate either directly with other systems or indirectly through an implanted monitor to communicate with other systems. Other systems that a disclosed Fluid Status Monitoring Device may communicate with could be either implanted within the body or external to the body.

FIG. 1 schematically depicts a generic system according to the present disclosure. As shown therein a medical treatment system 100 of the present disclosure includes a Fluid Status Monitoring System 102 with a Fluid Status Monitoring Device 104 and Fluid Status Monitoring control system 106 as described above and in the incorporated applications. An external antenna 108 receives the vascular dimension signal from Fluid Status Monitoring Device 104, which is then processed into fluid status information by control system 106. Control system 106 communicates with one or more of implanted therapeutic devices or systems 110 and/or external therapeutic devices or systems 112 via communication channels 114, which may be wired or wireless. Therapies provided by systems 110 and 112 are modulated and/or optimized by their internal control systems based on patient fluid status information received from control system 106. Such information may be provided periodically or continuously to allow for real-time closed loop feedback control. An alternative embodiment could include a Fluid Status Monitoring Device 104 which communicates directly to the implanted therapeutic system 110 without the signal being first transmitted outside the body. Specific embodiments of various systems following this general arrangement are further described below.

Assisted Diuresis

Figure 2:
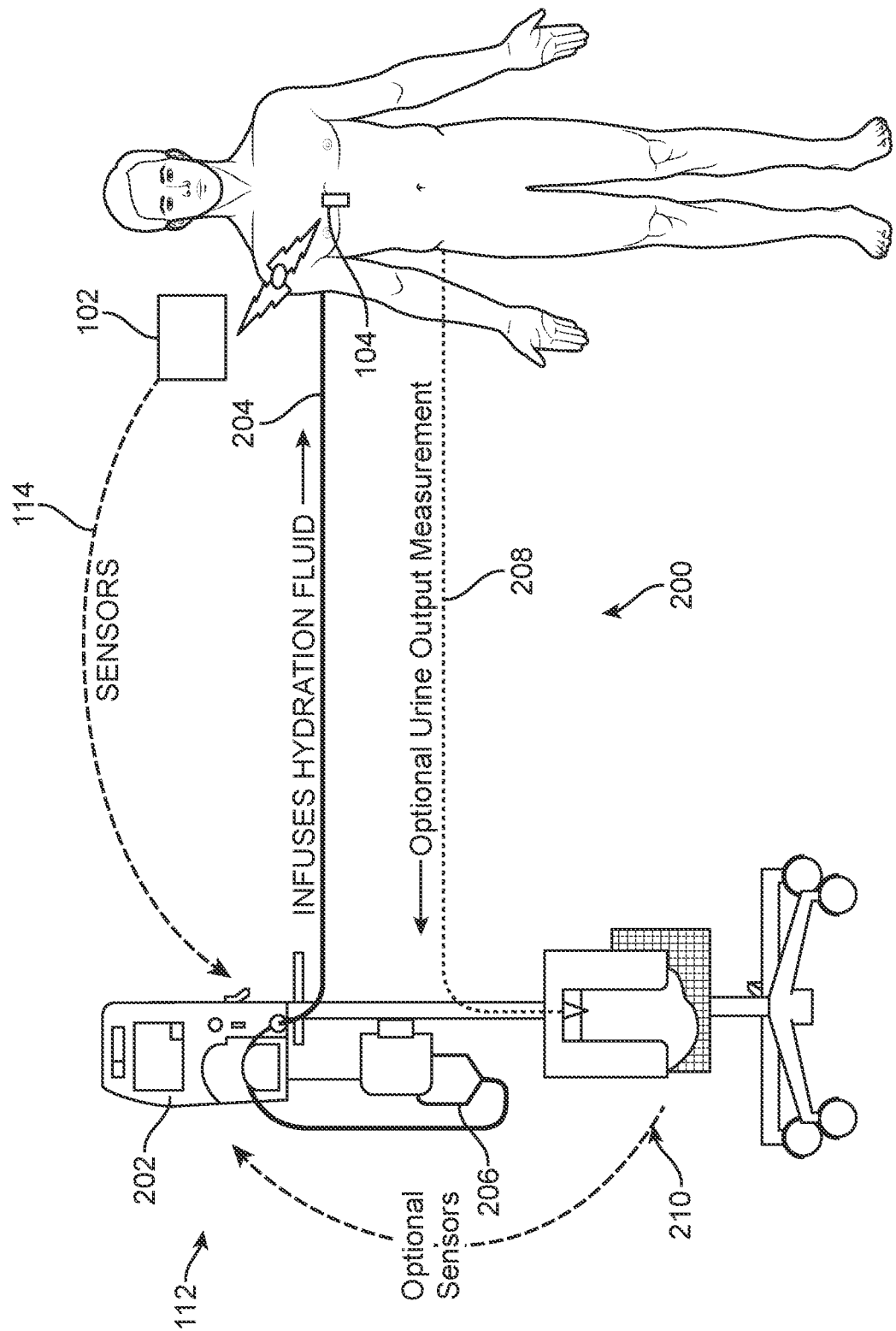
FIG. 2 is a schematic depiction of an embodiment of an assisted diuresis system according to the present disclosure.

Systems have been proposed to assist with the physiology of diuresis by infusing fluid into the patient as diuresis occurs to maintain optimal renal function and ultimately increase the volume of fluid removed from the patient, as disclosed, for example, in U.S. Publication No. US2018/0326151, filed Jul. 11, 2018, and published on Nov. 15, 2018, entitled "Fluid Therapy Method." Fluid Status Monitoring Devices and Systems as described herein-above may be integrated with these assisted diuresis systems such as disclosed in the foregoing published application. An assisted diuresis system according to the present disclosure, such as schematically depicted in FIG. 2, may be used in heart failure diuresis for the administration of saline while giving high doses of diuretics. Such treatments have been shown to increase the overall volume of urine extracted in heart failure patients and other patients in need of fluid balance treatments.

As illustrated in FIG. 2, in an improved diuresis system 200 according to the present disclosure, Fluid Status Monitoring System 102 as disclosed above provides accurate, early, real-time intravascular fluid status information via vascular dimension metric as determined by a Fluid Status Monitoring Device 104, thus allowing overall system 200 to determine the optimal level of circulating blood volume to maximize the urine output. In prior systems, urine output was measured by placing a Foley catheter, connecting it to a urine collection bag, and continuously measuring the weight of the urine collection bag. This measurement of urine output was then used as an indirect surrogate to manage the patient's circulating blood volume and overall fluid status. However, this is not an ideal surrogate because other factors are involved such that urine output may not always accurately reflect circulating blood volume of the patient. Moreover, the balance of fluid between the intravascular and extravascular spaces is unknown. This knowledge gap limits the ability of the system to operate optimally as neither intravascular nor extravascular fluid states are being measured. The lack of an accurate intravascular sensor, in particular, presents other challenges. For example, the initial fluid status of the patient is unknown and therefore there is a risk of hypovolemia or hypervolemia until the treatment protocol is well underway. Intravascular volume measurement might also help to manage the end of the treatment protocol, to assess when sufficient diuresis has occurred and prevent overtreatment. Also, in one typical implementation, a weight sensor is used to determine fluid output automatically as a control parameter, which can introduce further inaccuracies. Additional disadvantages include the fact that catheterization with a Foley catheter is a cumbersome, unpleasant additional requirement for the patient, that presents a risk of infection and additional care requirements for care providers.

In the improved system 200, shown in FIG. 2, circulating blood volume is accurately estimated in real-time, continuously if required, by Fluid Status Monitoring System 102. System 102 communicates with the external treatment system 112, which in this case may comprise processor-controlled infusion pump 202, which delivers the infusate via infusion line 204. Reservoir 206 may provide a known quantity of infusate to be delivered at the rate set by infusion pump 202 based on patient fluid status information as determined by Fluid Status Monitoring System 102 communicating through communication channels 114 with pump 202. The same or additional processor-controlled syringe pump(s) or infusion pump(s) also may deliver a diuretic such as Furosemide and/or other medicaments to increase or decrease the rate of diuresis. It should be recognized that the present embodiment does not preclude the use of a Foley catheter 208 as a further optional system element. In such cases, optional additional sensors 210 may be employed, such as a weight sensor, to determine urine output as a further parameter input to external system 112.

In general, as can be seen based on the example shown in FIG. 2, the disclosed Fluid Status Monitoring Systems and Devices may be employed as direct inputs to IV diuretic pumps, syringe pumps and other infusion devices to facilitate automated administration and control of IV diuretics. The ability of the disclosed Fluid Status Monitoring Systems to detect the onset of hypovolemia would allow the IV drug pump or other infusion device to be run at a higher rate in the initial phases of diuresis and then reduce the drug dosage and/or increase the infusion of saline or other fluids as hypovolemia is approached. This would maintain a euvolemic state while also maximizing the fluid removed and minimizing the total time of therapy and total dose of drugs administered to the patient.

Acute Kidney Injury

Contrast induced nephropathy (CIN) occurs in some patients undergoing interventional or surgical procedures. Infusion technologies such as disclosed in U.S. Publication No. US2010274217, filed Jan. 14, 2010, and published on Oct. 28, 2010, and entitled "Fluid Replacement Device," infuse saline and diuretics before and during procedures to increase the rate of urine output, thereby diluting the contrast in the kidneys and increasing the rate of contrast excretion. CIN is sometimes defined as a 25% increase in serum creatinine (SCr) from baseline. Possible treatments for CIN involve hydration treatments that infuse saline before and during procedures to dilute the contrast in the kidneys. Conventionally, as with assisted diuresis described above, a Foley catheter has been required to measure the urine output and match the infusion flow rate to maintain fluid balance. However, using a system such as described above and shown in FIG. 2, hydration treatment for CIN may be accomplished with more direct and more accurate assessment of the blood volume status of the patient. This would eliminate the need for a Foley catheter and provide the opportunity to optimize the infusion rate.

Direct Sodium Removal

In some patients with fluid volume overload due to heart failure, there may be excess sodium as well as excess water. Removing both at once can be challenging. Often, use of diuretics to treat ADHF leads to removal of water, but not much sodium. If the salt is not removed, the water is often rapidly reabsorbed. One potential solution for this problem can be direct sodium removal (DSR), such as disclosed in U.S. Publication No. US2018344917, filed May 21, 2018, and published on Dec. 6, 2018, and entitled "Direct Sodium Removal Method, Solution and Apparatus to Reduce Fluid Overload in Heart Failure Patients". DSR systems propose taking advantage of the well-known phenomenon that "water follows salt." In the system disclosed in the foregoing US patent publication, a hypotonic (low-sodium) infusate is introduced to the peritoneal cavity. Osmotic pressure draws sodium from the rest of the body into the infusate. The infusate is then removed from the peritoneal cavity by an implanted pump, removing the sodium with it. The body responds to this sodium removal by excreting a corresponding volume of water. In one option, the implanted pump directly transfers the removed infusate to the bladder for excretion through natural processes.

Figure 3A:
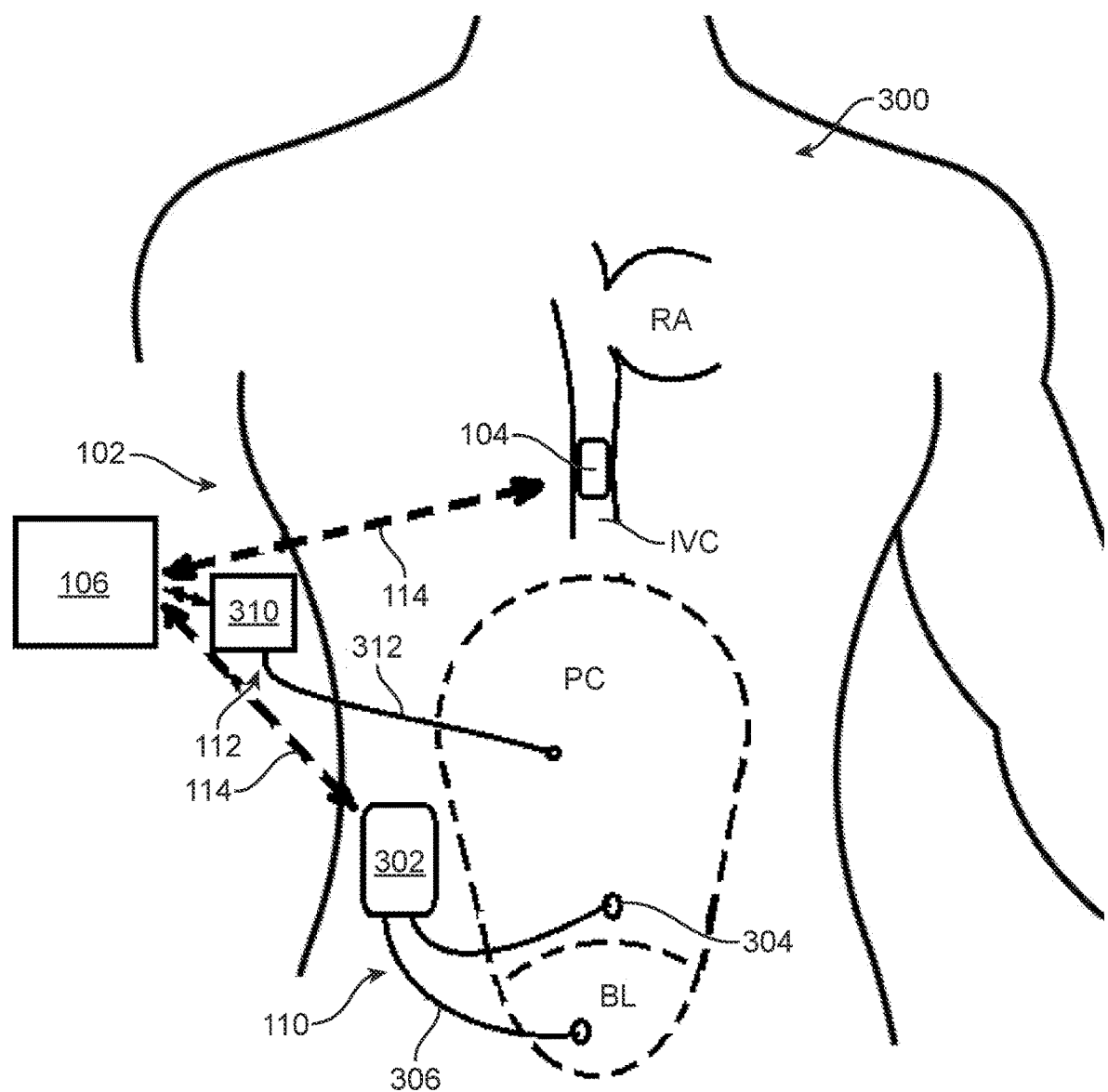
FIG. 3A is a schematic depiction of an embodiment of a direct sodium removal system according to the present disclosure.

A key challenge in the implementation of the DSR system is determination of blood volume status of the patient as an input into the sodium removal process. FIG. 3A schematically illustrates an embodiment of such a system utilizing the Fluid Status Monitoring Systems described above. In this embodiment, DSR system 300 includes, as an implanted therapy system 110, implantable peritoneal transfer pump 302, with a peritoneal catheter 304 disposed in the peritoneal cavity (PC) and a bladder catheter 306 disposed in the bladder (BL). Fluid Status Monitoring System 102 includes Fluid Status Monitoring sensor 104 (in this example a wireless resonant circuit-based sensor disposed in the patient's IVC, although other disclosed sensor positions and types may be employed). External antenna 108 (see FIG. 1) is omitted in FIG. 3A for clarity.

Fluid Status Monitoring control system 106 communicates through wireless communication channels 114 with implanted pump 302 and with an external therapy system 112, in this case comprising infusion pump 310 and peritoneal infusion catheter 312 (or alternatively syringe delivery of infusate). Integration of Fluid Status Monitoring control system 106 with the DSR system permits optimization of both infusate delivery via pump 310 and excess fluid transfer and removal via implanted pump 302 based on knowledge of the patient's precise blood volume status, thus informing the process parameters such as infusate flow rate or concentration and pump flow rate. In a further alternative embodiment, infusion pump 310 may also be an implanted device rather than an external treatment device.

Figure 3B:
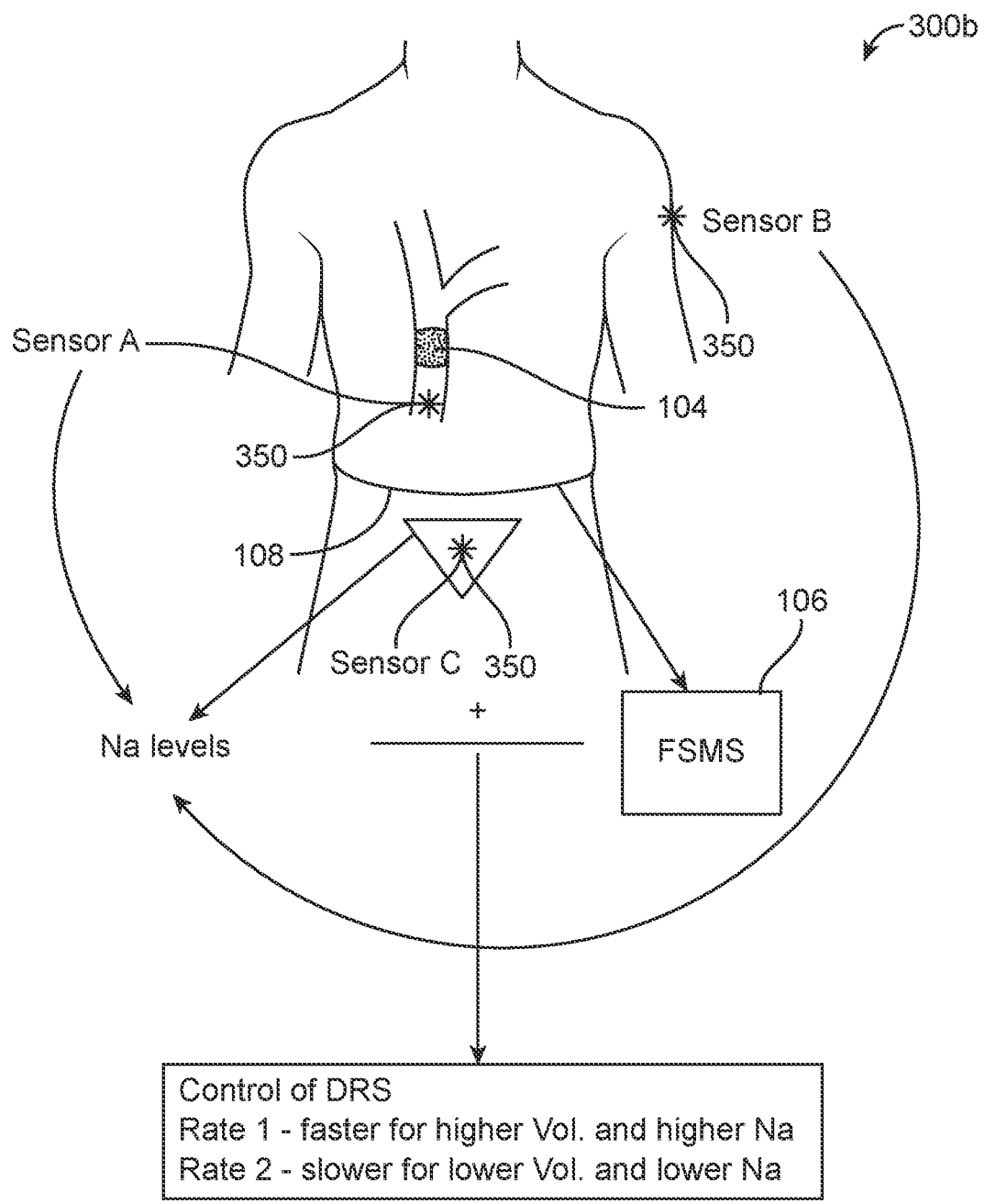
FIG. 3B is schematic depiction of an alternative embodiment of the direct sodium removal system with the addition of a sodium sensor.

Another key challenge associated with the DSR system is the determination of the blood sodium levels as an input into the sodium removal system and process. FIG. 3B schematically illustrates an alternative embodiment of DSR System 300b, again including as part of the system a Fluid Status Monitoring System, as described hereinabove. DSR System 300b utilizes a sodium sensor 350 to determine the blood sodium levels as a way to prevent hyponatremia, a low sodium concentration in the blood which is a common occurrence in the use of a DSR system. The sodium sensor 350 and the Fluid Status Monitoring control system 106 controls the amount of fluid removed so as not to lead to low-sodium-associated events including hyponatraemia. If the sodium (Na) sensor 350 detected blood sodium levels below a threshold, set in the system or set individually by the physician, it would then trigger the DSR system to slow the pump speed and thus the rate of sodium removal and vice versa, to manage sodium levels and avoid hyponatraemia.

In one example, system 300b utilizes input from sodium sensor 350, which could be designed and positioned in a number of locations (see FIG. 3B) or could use combinations of these devices and locations:

Intravascularly as an implanted sensor 350 measuring blood sodium (sensor position A)
    Externally as a sensor on the skin providing an alternative way to monitor sodium (sensor position B).
    Within the bladder to measure the excreted sodium levels (sensor position C)

Figure 13:
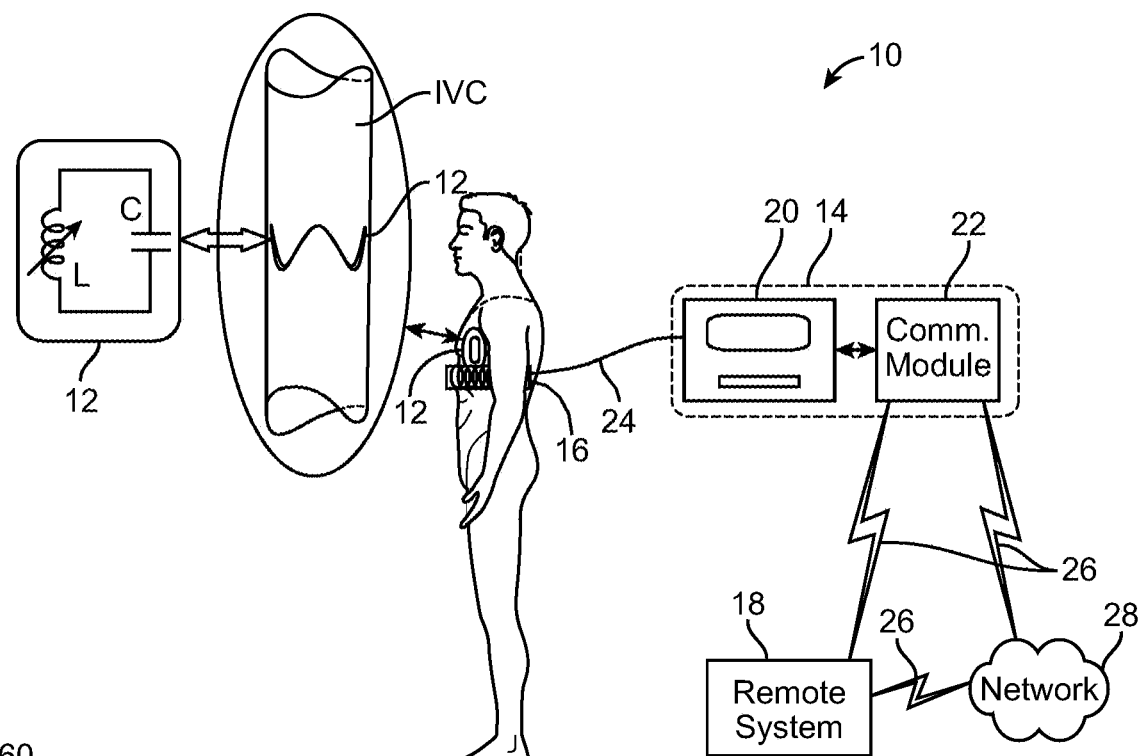
FIG. 13 schematically depicts an embodiment of a wireless resonant circuit-based vascular monitoring ("RC-WVM") system of the present disclosure.

As shown in FIG. 13, in one embodiment, wireless vascular dimension monitoring system 10 according to the present disclosure may generally comprise a wireless, resonant circuit-based vascular monitoring ("RC-WVM") sensor implant 12 configured for placement in a patient's IVC, control system 14, antenna module 16 and, optionally, one or more remote systems 18 such as processing systems, user interface/displays, data storage, etc., communicating with the control and communications modules through one or more data links 26, which may be wired or remote/wireless data links. In many implementations, remote system 18 may comprise a computing device and user interface, such as a laptop, tablet or smart phone, which serves as an external interface device.

RC-WVM implants 12 generally comprise a variable inductance, constant capacitance, resonant L-C circuit formed as a resiliently collapsible coil structure, which, when positioned at a monitoring position within the patient's IVC, moves with the IVC wall as it expands and contracts due to changes in fluid volume. The variable inductance is provided by the coil structure of the implant such that the inductance changes when the dimensions of the coil change with the IVC wall movement. The capacitive element of the circuit may be provided by a discrete capacitor or specifically designed inherent capacitance of the implant structure itself. In general, RC-WVM implants 12 are configured to at least substantially permanently implant themselves in the vascular lumen wall where placed upon deployment and do not require a physical connection (for communications, power or otherwise) to devices outside the patient's body after implantation. "Substantially permanently implanted" as used herein means that in normal usage the implant will, throughout its useful, operational life, remain implanted in the vascular lumen wall and may to varying degrees become integrated into the vascular lumen wall by tissue ingrowth, but the implant may be intentionally removed as medically dictated by an intravascular interventional or surgical removal procedure specifically undertaken for the purpose of removing the implant. Details of alternative embodiments for implant 12 are described in the incorporated applications and it should be noted that any of the alternative vascular dimension monitoring implants disclosed therein may be utilized in alternative systems as described.

Control system 14 comprises, for example, functional modules for signal generation, signal processing and power supply (generally comprising the EFM circuits and indicated as module 20), and communications module 22 to facilitate communication and data transfer to various remote systems 18 through data links 26 and optionally other local or cloud-based networks 28. Details of control system 14, modules 20 and 22, and elements of alternative embodiments thereof are described in the incorporated applications. After analyzing signals received from RC-WVM implant 12 after being excited by a transmit coil of an EFM circuit, results may be communicated manually or automatically to the patient, a caregiver, a medical professional, a health insurance company, and/or any other desired and authorized parties in any suitable fashion. Results also may be communicated directly to an interventional device as a control parameter as further described hereinbelow.

Antenna module 16 is connected to control system 14 by power and communication link 24, which may be a wired or wireless connection. Antenna module 16 creates an appropriately shaped and oriented magnetic field around RC-WVM implant 12 based on signals provided by the EFM circuitry of control system 14. The magnetic field energizes the L-C circuit of RC-WVM implant 12 causing it to produce a "ring-back" signal indicative of its inductance value at that moment. Because the inductance value is dependent on the geometry of the implant, which changes as mentioned above based on dimensional changes of the IVC in response to fluid state heart rate etc., the ring-back signal can be interpreted by control system 14 to provide information as to the IVC geometry and therefore fluid state. Antenna module 16 thus also provides a receive function/antenna as well as a transmit function/antenna.

The variable inductance L-C circuit produces a resonant frequency that varies as the inductance is varied. With the implant securely fixed at a known monitoring position in the IVC, changes in geometry or dimension of the IVC cause a change in configuration of the variable inductor, which in turn cause changes in the resonant frequency of the circuit. These changes in the resonant frequency can be correlated to changes in the vessel geometry or dimension by the RC-WVM control and communication system. Thus, not only should the implant be securely positioned at a monitoring position, but also, at least a variable coil/inductor portion of the implant should have a predetermined resilience and geometry. In general, the variable inductor is specifically configured to change shape and inductance in proportion to a change in the vessel geometry. In some embodiments, an anchoring and isolation means will comprise appropriately selected and configured shape and compliance in the sensor coil structure of the implant so as to move with the vessel wall while maintaining position. Such embodiments may or may not include additional anchoring features.

RC-WVM implant 12 as a variable inductor is configured to be remotely energized by an electric field delivered by one or more transmit coils within the antenna module positioned external to the patient. When energized, the L-C circuit produces a resonant frequency which is then detected by one or more receive coils of the antenna module. Because the resonant frequency is dependent upon the inductance of the variable inductor, changes in geometry or dimension of the inductor caused by changes in geometry or dimension of the vessel wall cause changes in the resonant frequency. The detected resonant frequency is then analyzed by the RC-WVM control and communication system to determine the change in the vessel geometry or dimension. Information derived from the detected resonant frequency is processed by various signal processing techniques as described herein and may be transmitted to various remote devices such as a healthcare provider system or patient system to provide status, or in appropriate instances, alerts or modifications in treatment. In order to facilitate measurement of the detected resonant frequency, it may be desirable to provide designs with a relatively higher Q factor, i.e. resonant circuit configurations that maintain signal/energy for relatively longer periods, especially when operating at lower frequencies. For example, to realize advantages of designs employing Litz wire as further described herein, it may be desirable to operate in a resonant frequency range of below 5 MHz, typically between about 1 MHz and 3 MHz, in which case resonant circuit configuration with a Q factor of at least about 50 or greater may be desired.

Figure 14:
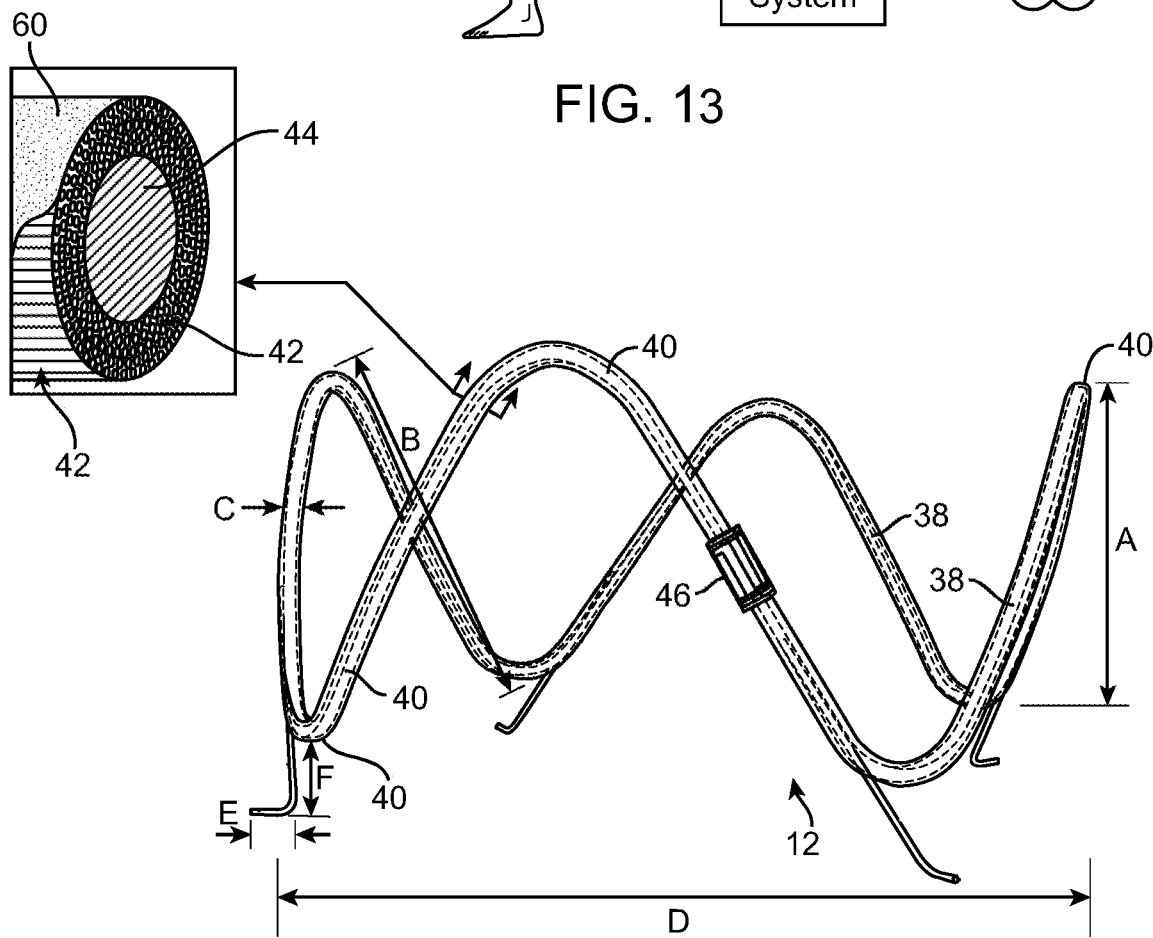
FIG. 14 illustrates an embodiment of an RC-WVM implant in accordance with the teachings of the present disclosure.

FIG. 14 illustrates an example of RC-WVM sensor implant 12 according to the present disclosure as may be used in exemplary system 10. The enlarged detail in the box of FIG. 14 represents a cross-sectional view taken as indicated. (Note that in the cross-sectional view, individual ends of the very fine wires may not be distinctly visible due to their very small size). In general, RC-WVM implants 12 comprise a resilient sensor construct generally including an inductive coil formed around an open center to allow substantially unimpeded blood flow therethrough, wherein the inductive coil changes inductance with changes in the construct geometry as a result of forces applied to it. In this example, implant 12 is formed as a resilient, concentric zig-zag or linked "Z-shapes" structure with a series of straight strut sections 38 joined at their ends by rounded crown sections 40 forming acute angles. The resultant structure may also be considered to be sinusoidal in appearance. This structure may be formed by wrapping conductive wires 42 onto a frame or core 44. In this alternative, RC-WVM implant 12 has a shape set 0.010" nitinol wire frame 44 around which 300 strands of 0.04 mm diameter gold, individually insulated, Litz wire 42 are wrapped in a single loop. With a single loop wrap, the strands of wire 42 appear substantially parallel to the frame at any given point, as can be seen in the cross-section view of FIG. 14. Individual insulation on Litz wires 42 may be formed as a biocompatible polyurethane coating. Also in this particular example, discrete capacitor 46 is provided with a capacitance of approximately 47 ηF (nano-Farads); however, the capacitance may be in the range of about 180 pico-Farads to about 10 micro-Farads, to cover all potential allowable frequency bands (from about 148.5 kHz to about 37.5 MHz) for RC-WVM implants 12. In one alternative, rather than a relatively large number of wire strands in a single loop, a relatively few number of strands, e.g. in the range of about 10-20 strands, or more particularly about 15 strands, may be arranged in a relatively larger number of loops, e.g. in the range of about 15-25 loops, or more particularly about 20 loops.

The overall structure of RC-WVM implants 12 presents a balance of electrical and mechanical requirements. For example, an ideal electrical sensor is as close to a solenoid as possible with strut lengths as short as possible and ideally zero, whereas mechanical considerations of deployment and stability dictate that implant strut lengths be at least as long as the diameter of the vessel into which it is to be deployed to avoid deployment in the wrong orientation and maintain stability. Dimensions of elements of RC-WVM implant 12 are identified by letters A-F in FIG. 14, and examples of typical values for those dimensions, suited for a range of patient anatomies, are provided below in Table I. In general, based on the teachings herein, persons skilled in the art will recognize that the uncompressed, free-state (overall) diameter of RC-WVM implants 12 should not significantly exceed the largest anticipated fully extended IVC diameter for the patient in which the RC-WVM implant is to be used. RC-WVM implant height generally should be selected to balance implant stability at the monitoring position with geometry/flexibility/resilience providing the ability to fit in the intended region of the IVC without impacting either the hepatic or renal veins in the majority of the population, which could compromise sensing data produced by the implant. Height and stability considerations will be influenced, among other factors, by specific RC-WVM implant design configuration and whether or not distinct anchor features are included. Thus, as will be appreciated by persons skilled in the art, primary design considerations for RC-WVM implants 12 according to the present disclosure are provisions of structures forming variable inductance L-C circuits with the ability to perform the measuring or monitoring function described herein, and which are configured to securely anchor the structures within the IVC without distortion of the IVC wall by providing adequate, but relatively low radial force against the IVC wall.

TABLE I

RC-WVM Implant 12
Example Dimensions

| Dim. | Element Name | Approximate Size (in millimeters) |
|---|---|---|
| A | Height | 10-100, typically about 20 |
| B | Strut length | 10-100, typically about 25 |
| C | Strut diam. | 0.1-2, typically about 1.5 |
| F | Anchor Length (extending) | 1-10, typically about 5 |
| E | Anchor Length (barb) | 0.25-3, typically about 1.8 |
| D | Overall Diameter | Three Sizes: 20 mm/25 mm/32 mm +/− 3 mm |

Alternatively, multiple (for example, approximately fifteen) strands of wire 42 are laid parallel to each other and twisted into a bundle. This bundle is then wrapped, multiple times, around the entire circumference of wire frame 44 (which may be, for example, a 0.010" diameter nitinol wire) resulting in multiple turns of parallel bundles of strands. The insulation between the bundles results in a distributed capacitance that causes the RC-WVM to resonate as previously. An outer, insulation layer or coating 60 may be applied either as previously described or using a dipping or spraying process In this case, as one example, 20 turns of 15 strands of wire are used along with an outer insulation layer 60 of silicone.

Hyponatremia is among the most common electrolyte disorders in dialysis patients and there is increasing levels of evidence that suggests that hyponatremia is a risk factor for mortality as well as substantial morbidity, including central nervous system toxicity, hip fracture, immune dysfunction and infection, and cardiovascular complications.

Figure 4:
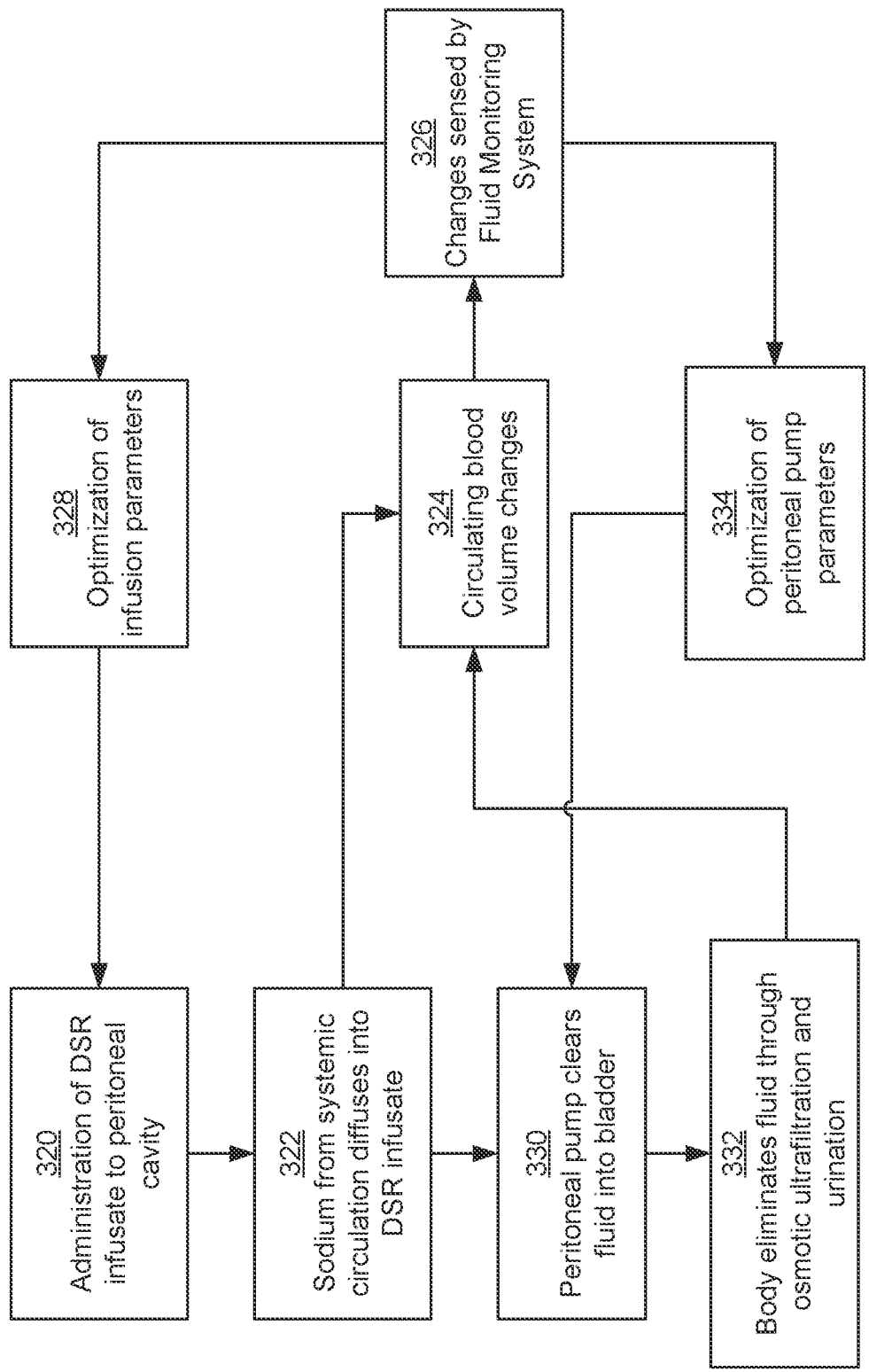
FIG. 4 is a flow diagram depicting an embodiment of a process for direct sodium removal according to the present disclosure.

FIG. 4 illustrates a process flow for DSR treatment according to one embodiment disclosed herein. Treatment will typically begin with administration of DSR infusate 320 after which sodium from circulation diffuses into DSR infusate 322. This may lead to increased urination to normalize the salt-water balance, which could then reduce circulating blood volume. Circulating blood volume changes 324 are sensed by the Fluid Status Monitoring System 326 and, in one option, DSR infusion parameters are optimized 328 based on control by the Fluid Status Monitoring System and Sodium Sensing Module. Optimization may include modulation of the protocol for external administration of infusate (via syringe or external infusion pump), or in other alternative embodiments, and may include the control of an implanted pump system to administer infusate with direct input from the Fluid Status Monitoring System. After sodium has diffused into the infusate at 322, the implanted peritoneal pump transfers the fluid from the peritoneal cavity to the bladder 330 and the body eliminates the excess fluid 332. Again, changes in circulating blood volume 324, in this case due to fluid removal, are determined by the Fluid Status Monitoring System 326. Peritoneal pump parameters are thus optimized 334 based on control by the Fluid Status Monitoring System. In this case, examples of optimization include modulation of protocols for external modification of the pump settings by a clinician or direct receipt of the input signal from the Fluid Status Monitoring System and thus direct control of peritoneal pump parameters.

As in the assisted diuresis case above, a key advantage of this novel system is not only the accurate assessment of the intravascular fluid volume but also the extravascular fluid status, detected by the changes in the intravascular volume over time as fluid shifts from extravascular to intravascular and vice versa. For example, if a large net volume of urine is removed but the estimated circulating blood volume does not change, then it is clear that all of this volume was removed from the extravascular compartment.

IVC or SVC Occlusion for Diuretic Efficiency

In some clinical situations for patients in heart failure, it may be desirable to occlude the IVC below the renal veins in order to improve renal function and diuretic efficiency by reducing the blood pressure in the renal veins. In other situations, occlusion of the SVC may be helpful. A goal is to improve the kidney function by increasing the net perfusion pressure (arterial-venous pressure) to the kidney, thereby increasing renal blood flow and decreasing renal sympathetic activation. Both of these changes can have the effect of increasing urine output. An example of this type of system is disclosed in U.S. Publication No. US2018014829, filed Sep. 27, 2017, and published Jan. 18, 2018, and entitled "Blood Flow Reducer for Cardiovascular Treatment". However, a challenge with this approach to treatment is to know how much occlusion is required and how to measure the IVC. A number of solutions are possible based on the Fluid Status Monitoring Systems and Devices disclosed herein. For example, placement of a Fluid Status Monitoring Device between the hepatic and renal veins may provide information on IVC geometry, degree of occlusion from flow, renal function and circulating volume refill perspectives.

A number of different embodiments are possible based on disclosed Fluid Status Monitoring Systems. In situations where the patient is a chronic heart failure patient and may already have implanted a Fluid Status Monitoring Device as disclosed, then inputs from Fluid Status Monitoring control system (106 in FIG. 1) may be used as control parameters for the occlusion device. In some cases where it may not be desirable to implant an occlusion device in the IVC long term, such devices would more typically be catheter-based for relatively quick deployment and removal. With the patient catheterized for IVC occlusion, it may be preferable to utilize a catheter-based Fluid Status Monitoring System as disclosed, for example in the present Applicant's incorporated U.S. patent application Ser. No. 15/750,100, filed Aug. 3, 2016 (U.S. Publication No. US20180220992, published Aug. 9, 2019) rather than a wireless implant as elsewhere disclosed. In other cases, an implanted occlusion device may be deemed appropriate and an implantable version of the system described above could be used. Such a fully implanted system may include an occlusion member that would, for example, inflate and deflate automatically in response to signals from the fluid status monitoring device, occluding the flow optimally to facilitate optimal renal function. In such an embodiment, the device may include a reservoir disposed outside the IVC communicating with the inflatable occlusion member inside the IVC via a micro transfer pump controlled by the Fluid Status Monitoring control system 106 or may include a leaflet, tilting disc or other occlusion member, its position relative to the IVC flow modulated by the control system to appropriately occlude IVC flow.

In an alternative embodiment, a combined Fluid Status Monitoring System and IVC Occlusion Device might be implanted within the IVC. A Fluid Status Monitoring System might be implanted in the IVC between the renal veins and hepatic veins, connected directly to an IVC Occlusion Device implanted between the iliac veins and the renal veins. If the IVC Occlusion Device is mechanical and operated using an electrical motor, solenoid, or valve, it could be connected to the Fluid Status Monitoring System with wires. If the IVC Occlusion Device is an inflatable balloon or bladder, the combined device might have a second, longer and relatively low-profile tubular reservoir located near the Fluid Status Monitoring System, perhaps positioned against one wall of the IVC. It would be fluidly connected to the balloon or bladder of the IVC Occlusion Device. A pump located between the reservoir and balloon could transfer fluid from one chamber to the other, to inflate or deflate the IVC Occlusion Device in response to a signal from the Fluid Status Monitoring System. This combined system could be completely implantable and autonomous, or it could rely upon an external controller and/or transcutaneous energy delivery system to wirelessly control and power the system.

In yet another alternative embodiment, the Fluid Status Monitoring System could be combined with a Superior Vena Cava (SVC) Occlusion Device such as that proposed in U.S. Publication No. US20190126014, filed Oct. 23, 2018, and published May 2, 2019, and entitled "Systems and Methods for Selectively Occluding the Superior Vena Cava for Treating Heart Conditions". Intermittently partially occluding the SVC may cause increased blood flow back to the heart from the IVC. This lowers the IVC pressure, increases renal blood flow, and increases urine output.

Figure 5:
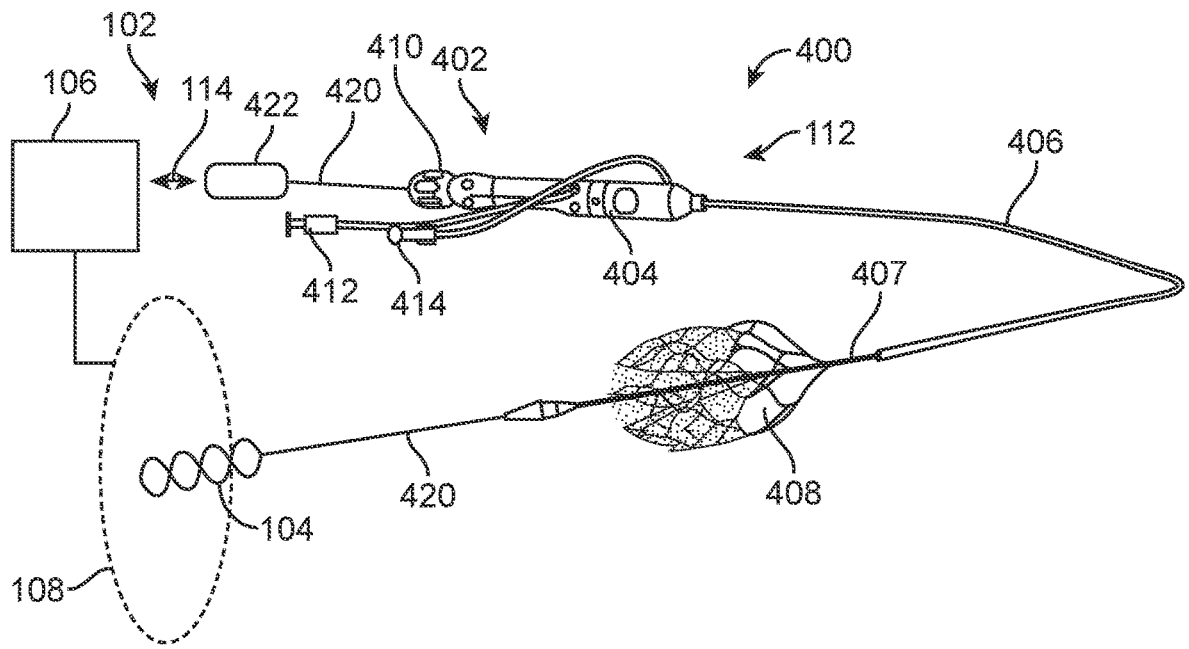
FIG. 5 is a schematic depiction of an embodiment of an IVC occlusion system according to the present disclosure.
Figure 6:
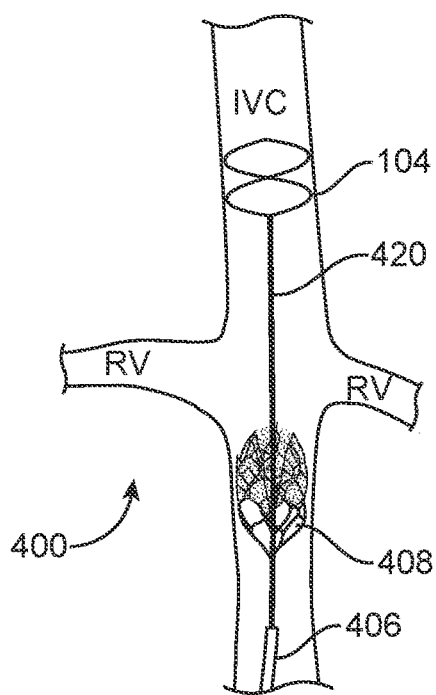
FIG. 6 is a schematic depiction of an IVC occlusion system according to an embodiment of the present disclosure as deployed in a patient IVC.

In another alternative embodiment, illustrated schematically in FIGS. 5 and 6, a Fluid Status Monitoring System and device may be incorporated into an IVC occlusion device. As shown therein, system 400 comprises an integrated external treatment device 112 formed as IVC occlusion catheter 402 with distal control handle 404 and catheter body 406. Catheter body 406 defines a lumen that carries delivery member 407 for occlusion device 408. Configuration and operation of catheter body 406 and delivery member 407 may be based on conventional guide catheter/guide wire designs. Occlusion device 408 may be made, for example, from a nitinol frame with a partial polyurethane coating to provide an obstructing member, which may be coated with an anti-thrombotic hydrogel. Occlusion device 408 expands when released from catheter body 406 and collapses by being drawn back into the catheter body. The size of the occlusion device 408, and thus the degree of occlusion, may be adjusted by turning adjustment knob 410 at the distal end of handle 404. Heparin port 412 and peripheral pressure port 414 also may be provided. A cvp port (not shown) through handle 404 and central lumen through delivery member 407 allow for over-the-guidewire placement of occlusion catheter 402, as well as subsequent deployment of catheter-based Fluid Status Monitoring System 102 as described below.

Catheter-Based Fluid Status Monitoring System 102 comprises delivery member 407, which is sized to be received through the cvp port and lumen of catheter 402. Deployable Fluid Status Monitoring Device is disposed at the distal end of delivery member 420 for deployment in the IVC cranially with respect to the renal veins (RV) as shown in FIG. 6. Hub 422 is used for manipulation of delivery member 420 and to provide communication through communication channel 114 with Fluid Status Monitoring control system 106. External antenna 108, which would surround the patient's torso to receive signals from Fluid Status Monitoring Device, also may optionally be included and communicate with Fluid Status Monitoring control system. For example, in embodiments wherein a resonant circuit-based Fluid Status Monitoring Device 104 is used, external antenna 108 would be required. However, where, for example, an ultrasound-based Fluid Status Monitoring Device is employed, then communication with control system 106 may be through a wired communication pathway defined by delivery member 420 and hub 422.

These systems for monitoring circulating blood volume and then intermittently partially occluding the IVC or SVC could significantly enhance diuresis by the kidneys. This would enhance the effectiveness of diuretics, and may enable some patients to reduce or eliminate the use of diuretics entirely. This may have beneficial effects for the patients, as the negative effects of long-term use of high levels of diuretics are well documented.

Comprehensive Fluid Management System

The management of volume-related diseases could be improved by a better understanding of the status of the balance/location of fluid within the body. Fluid can reside within a number of compartments within the body. In an average adult male, about two-thirds of the fluid volume resides in the intracellular compartment and one-third in the extracellular compartment. Spaces within the extracellular compartment include intravascular and extravascular spaces. As an example, an average 70 kg adult male may have about 14 liters of extracellular fluid, of which intravascular fluid accounts for approximately 3 liters, while extravascular fluid accounts for the remaining 11 liters. Within the intravascular space, the body also has the ability to quickly shift blood between the splanchnic system, holding about 25% of the intravascular volume, and the main circulating volume. Capillary microcirculation and osmotic flow across the vascular walls facilitate shifts between these compartments. Within the extravascular compartment, an excess of extravascular fluid and fluid pressure in tissue is described as edema. In heart failure patients, fluid can collect in the lungs (congestion). In certain patients, extracellular fluid can also collect in the abdominal cavity (ascites). Knowledge of the status of these multiple interconnecting systems is key in the management of patients with fluid-overload-related conditions such as heart failure or those on dialysis or ultrafiltration. More specifically in heart failure, excess intravascular fluid is ultimately transferred to the extravascular space where it can result in buildup of fluid in the lungs. In patients being treated for acute decompensated heart failure (ADHF), removal of excess intravascular fluid may lead to reabsorption of the fluid in the lungs by the circulatory system. However, these patients may still have significant excess extravascular fluid in their tissues which is not removed by the ADHF treatment. After release from the hospital, some of this excess extravascular fluid may migrate into the vascular system and from there into the lungs, leading rapidly to another event of ADHF. It would be very helpful to measure the fluid volumes in as many of the compartments as possible, to have a more comprehensive understanding of the patient's fluid volume status. This would be helpful in the acute setting, in management of ADHF or a specific episode of dialysis, and chronically, to maintain a patient's proper fluid balance and prevent episodes of ADHF.

A wide variety of sensors for measuring extravascular fluid volumes have been proposed, developed, and tested. An example of such an extravascular interstitial fluid sensor is described in U.S. Publication No. US20180271371, filed May 7, 2018, and published Sep. 27, 2018, and entitled "Wireless Interstitial Fluid Pressure Sensor". Interstitial fluid volumes can also be estimated via measurements within the lymphatic drainage system. Non-invasively, interstitial fluid volume can be estimated by various transdermal microneedle tissue sensors or by pure transdermal measurements of electrical conductivity, dielectric permittivity, analysis of sweat contents, and other means. One such sensor may comprise, for example, a bioimpedance-based fluid sensor such as disclosed in U.S. Publication No. US20190015013, filed Jul. 10, 2018, and published Jan. 17, 2019, entitled "Techniques for Determining Fluid Volumes Using Bioimpedance Information." To measure extravascular fluid in the lungs, a variety of implantable and wearable thoracic impedance measurement devices have been developed, such as devices disclosed in U.S. Publication No. US20190059777, filed Aug. 28, 2017, and published Feb. 28, 2019, and entitled "Method and System for Determining Body Impedance," and U.S. Publication No. US20130281800, filed Jun. 20, 2013, and published Oct. 24, 2013, and entitled "Method, System and Apparatus for Using Electromagnetic Radiation for Monitoring a Tissue of a User."

Figure 7:
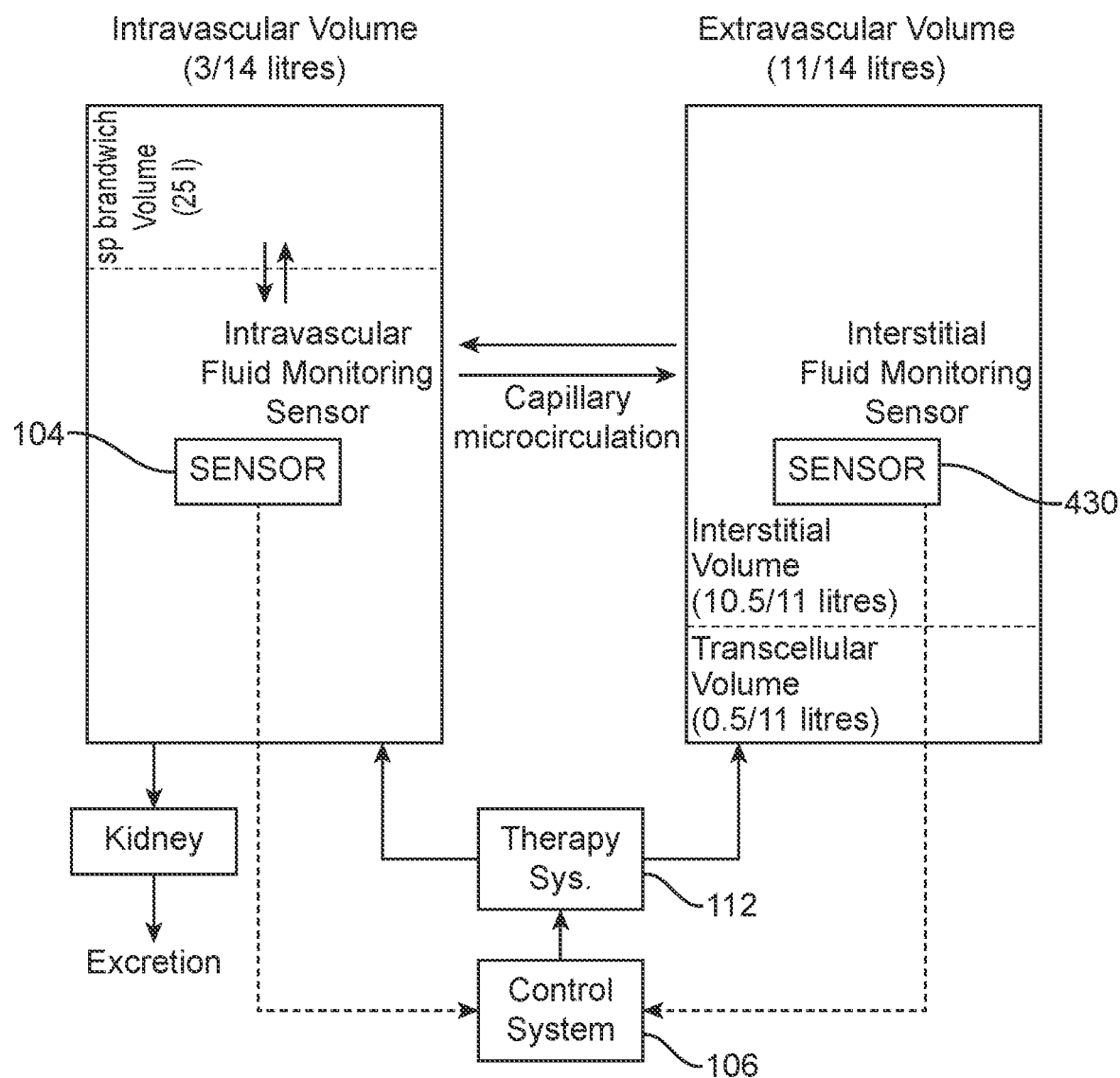
FIG. 7 is a schematic depiction describing the body fluid compartments in the body and their respective and relative volumes, and an embodiment of a fluid management system, capable of monitoring and managing the intravascular and interstitial fluid spaces individually.

FIG. 7 shows a schematic depiction of a system to monitor the distribution of fluid across the extracellular compartment and between the intravascular and extravascular spaces. In one embodiment, two or more sensors monitor intravascular and extravascular fluid status output signals to inform the overall fluid balance. As schematically depicted in FIG. 7, intravascular sensor 104, examples of which are discussed above, communicates with control system 106. Extravascular interstitial fluid sensor 430 also communicates with control system 106. Control system 106 may optionally control therapy delivered via therapy system 112 based on fluid status information received from each of the sensors. Alternatively, or additionally, an implanted therapy delivery system 110, as shown in FIG. 1, may be used and communicate with control system 106.

Intravascular fluid status monitoring sensor 104 provides information on the status of the fluid volume within the vessel in which it is placed, for example the IVC, and based thereon an accurate estimation of the intravascular circulating volume. Interstitial fluid monitoring sensor 430, used to measure interstitial or extravascular volume, may comprise any one or more of the sensors described above. These two sensor inputs (intravascular and extravascular) may be combined and analyzed in control system 106 in accordance with predetermined algorithms. In one embodiment, a single cloud-based analysis system may be used as control system 106 to manage comprehensive fluid status. The knowledge of the system balance as determined by control system 106 could then be used to better inform therapeutic decision making to optimize treatment on a personalized, individual basis and could be used to optimize therapy (diuresis/dialysis, etc.).

One application of this Comprehensive Fluid Management System is in chronic monitoring of heart failure patients. For example, it might be determined that although intravascular fluid volume is stable and at an acceptable level, extravascular fluid volume is gradually increasing, and therefore it makes sense to adjust the patient's care (such as increasing diuretic dose). This might decrease intravascular fluid volume, which causes some of the excess extravascular fluid to migrate into the intravascular compartment. Alternatively, extravascular volume may be decreasing, leading to dehydration, despite a normal intravascular fluid volume. Undetected dehydration is a major problem in the elderly, leading to hundreds of thousands of hospital visits every year. In this instance, the patient could reduce the dose of diuretics they are taking, if any, and/or drink additional rehydration fluids to restore their extravascular fluid level.

A second application of this Comprehensive Fluid Management System is in the management of dialysis patients. Since these patients are generating little or no urine with their kidneys, they are in a state of fluid overload every few days, and that fluid needs to be removed via dialysis. However, the dialysis process typically only lasts a few hours. During this period, the excess intravascular fluid is removed, and the intravascular sensor 104 can be used to manage the removal of as much excess intravascular fluid as possible without dangerously depleting intravascular fluid volume. At the same time, the extravascular interstitial fluid sensor 430 can monitor the extravascular volume, determining how much excess extravascular volume is present and how quickly it is migrating into the intravascular compartment. This extravascular monitoring may indicate when it is necessary to prolong the dialysis process after the toxins and excess intravascular fluids have been removed, in order to allow excess extravascular fluids to migrate into the extravascular space and be removed as well.

A third application of this Comprehensive Fluid Management System is in the management of acute decompensated heart failure (ADHF) patients. As mentioned above, patients undergoing treatment for ADHF are often discharged from the hospital or end treatment before sufficient excess fluids or salt have been removed. This often occurs in part because treatment with aggressive doses of diuretics is ineffective in generating additional urine production. Often the acute therapy removes the excess intravascular volume and the extravascular volume in the lungs, but not the rest of the excess extravascular volume in other tissues of the body. Since 80% of the fluid in the body is extravascular, if even a portion of the excess extravascular fluid migrates into the intravascular space, then the patient can very quickly return to a state of ADHF. Therefore, monitoring extravascular fluid volume as well as intravascular volume, and making sure that extravascular fluid volume is appropriately reduced, could dramatically improve the management and effectiveness of the fluid removal process.

Heart failure decompensation is often associated with the transition of fluid from intravascular, as monitored by sensor 104, to extravascular, as monitored by sensor 430 and ultimately ends up as fluid in the lungs leading to shortness of breath and acute presentation in the hospital. This combined sensor system would facilitate management of this complex biological system to guide patient care and avoid acute decompensations.

Another heart failure scenario in which this system can provide vital information is when this transfer of fluid from intravascular to extravascular ends up leading to ascites or the abnormal accumulation of fluid in the abdomen. This can lead to poor digestive performance and the subsequent poor uptake of orally administered diuretic medication, resulting in the spiraling worsening of patient symptoms due to systemic fluid retention, ultimately leading to decompensation and admission to hospital for intravenous diuretic administration. This system could prevent the onset of ascites through knowledge of the balance of intravascular and extravascular fluid statuses.

Lymphatic Drainage

Figure 8:
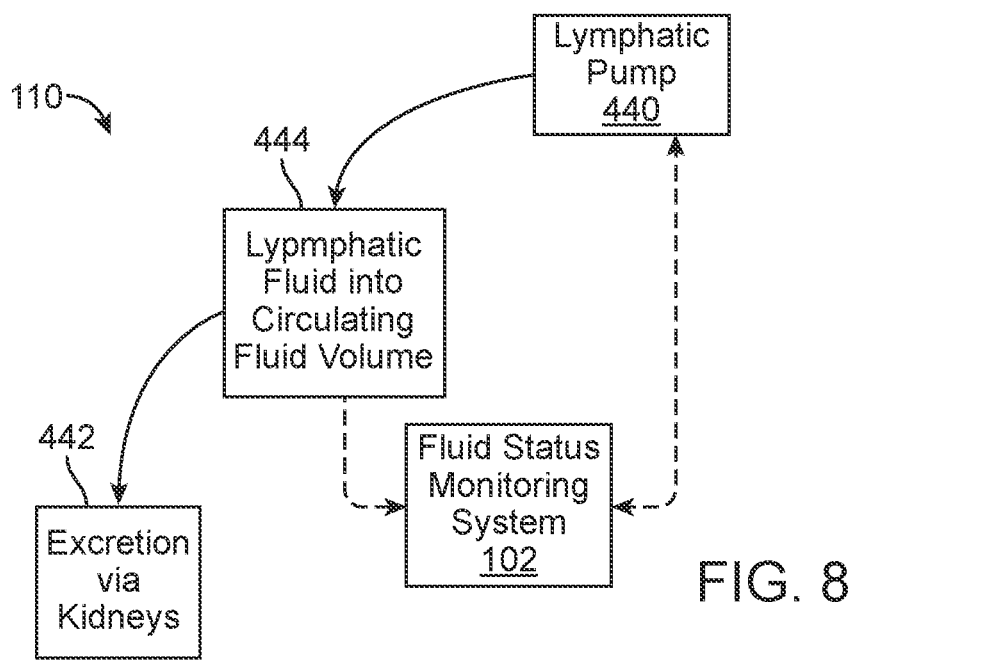
FIG. 8 is a block diagram depicting high-level operation of a fluid management system employing a lymphatic system assist pump according to further embodiments of the present disclosure.

In other embodiments, fluid balance may be modulated by augmenting natural drainage through the lymphatic system. The block diagram of FIG. 8 illustrates an example of such an approach. In such embodiments an implanted therapy system 110 may comprise a wirelessly controlled lymphatic pump 440, which assists the natural lymphatic system in delivering excess fluid into the circulating blood volume at 444 for natural excretion via the kidneys at 442. Alternatively, rather than a wireless lymphatic assist pump, a catheter-based system, such as disclosed, for example in U.S. Pat. No. 9,901,722, granted Feb. 27, 2018, and entitled "System and Method for Treatment of Pulmonary Edema," may be employed. In the case of use of a catheter-based lymphatic assist device, it may be preferable to utilize catheter-based embodiments of fluid status monitoring system 102 as described above.

Figure 9:
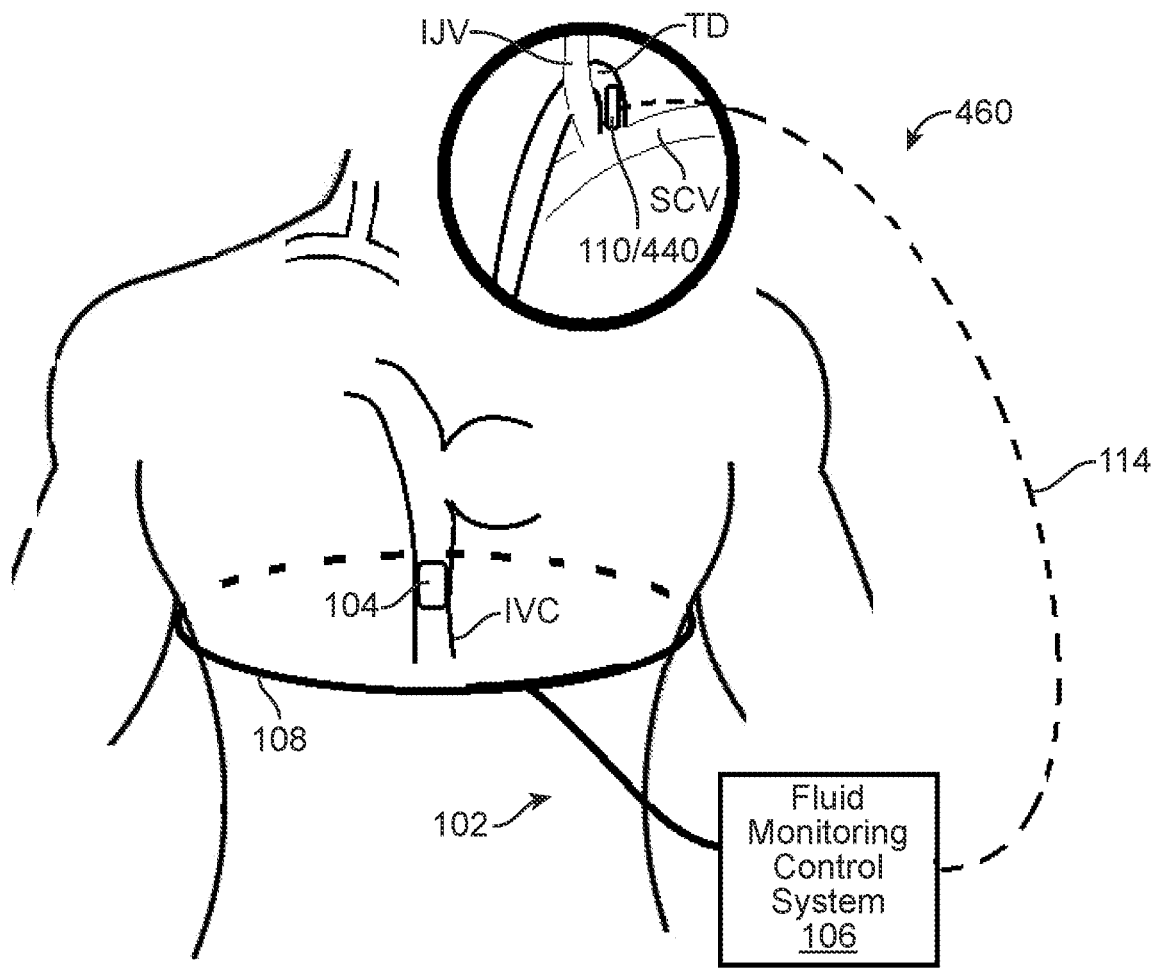
FIG. 9 is a schematic depiction of a patient fluid management system employing a wirelessly controlled lymphatic assist pump, showing an enlarged detail of patient anatomy at the branch of the inner jugular and subclavian veins.

FIG. 9 schematically depicts a wireless system 460 for lymphatic assist as means for modulating patient fluid balance. In one embodiment, wireless implanted lymphatic assist pump 440 is positioned in the thoracic duct (TD) adjacent the branch of the internal jugular vein (IJV) and subclavian vein (SCV) to drain lymphatic fluid into the circulating volume and ultimately out of the body via the kidneys. Other suitable locations for pump 440 may be devised by persons skilled in the art based on the teachings of the present disclosure. In this example, fluid status monitoring system 102 utilizes wireless monitoring device 104 implanted in the IVC and communicates with fluid monitoring control system 106 via external antenna 108 around the patient's chest. Control system 106 communicates with implanted pump 440 via wireless communications link 114, which allows for optimization of pump operating parameters based on patient fluid status as determined by direct measurement of the IVC volume. In one operating mode, by maintaining a slightly hypotensive or hypovolemic state, without allowing severe hypotension or hypovolemia, lymphatic flow may be optimized.

Diaphragm Stimulation

Phrenic nerve stimulation causing diaphragmatic movement has been investigated in the treatment of sleep apnea and heart failure patients. A pulse generator is implanted in the patients and a lead positioned in the left pericardiophrenic or right brachiocephalic vein in order to stimulate the phrenic nerve. This stimulation causes diaphragm contraction similar to that seen in normal breathing. The system is designed to stimulate the diaphragm at night when the patient is sleeping. The interaction between breathing, cardiac output, intravascular pressures and IVC volumes is accepted to be clinically relevant, but not well understood.

These stimulation systems do not have any ability to evaluate the intravascular fluid status of the patient as an input into the therapy. The combination of these systems with the aforementioned Fluid Management System 102 (FIG. 1) including Fluid Status Monitoring device 104 would enable the combined system to be adjusted based on the intravascular fluid status of the patient and therefore optimize their therapy.

Figure 10A:
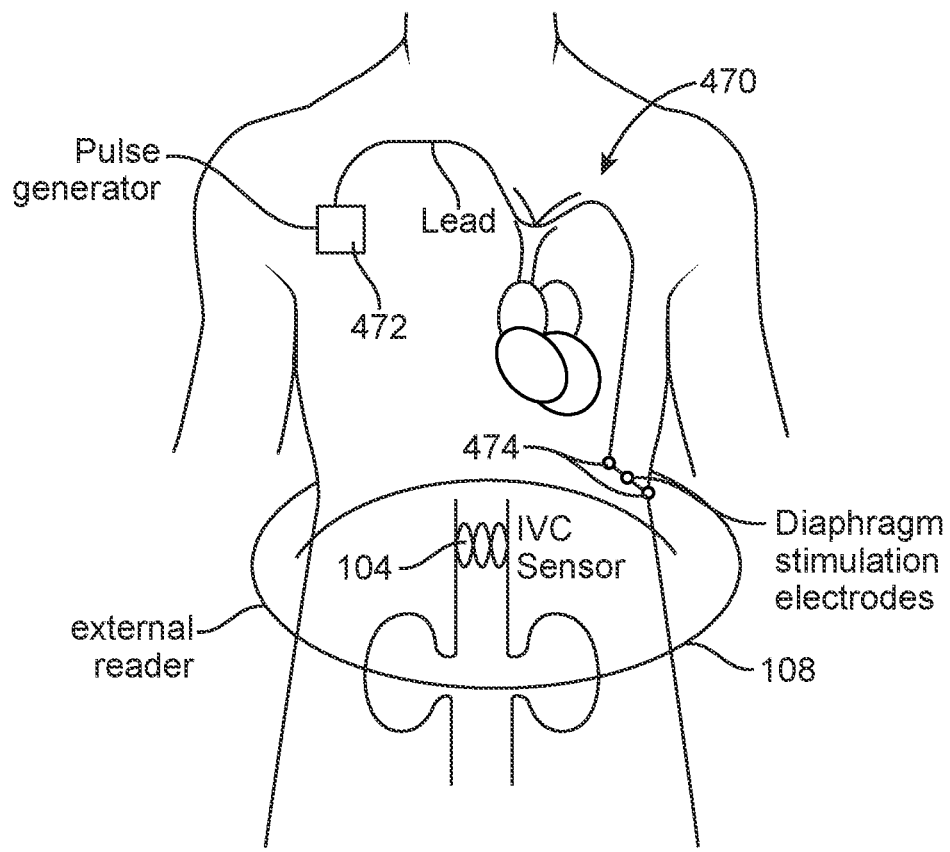
FIGS. 10A and 10B are schematic depictions of a patient treatment system including diaphragm stimulation with integrated fluid monitoring.
Figure 10B:
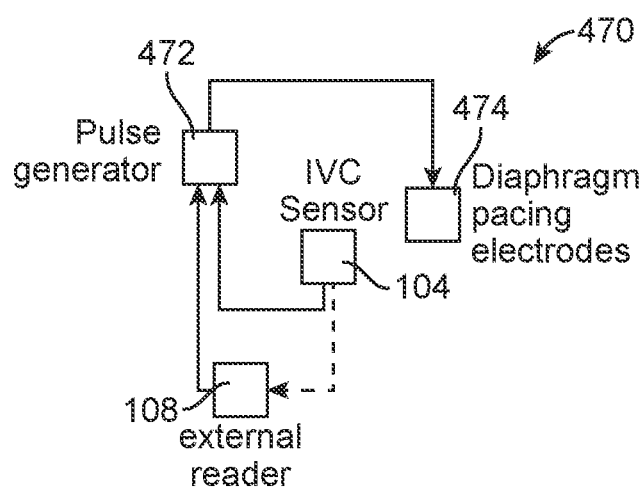

FIGS. 10A and 10B schematically depict a wireless system 470 for diaphragm stimulation with fluid monitoring input, as means for treating heart failure or sleep apnea patients. In one embodiment, diaphragm stimulation pulse generator 472 is positioned in the subclavian space and a lead 474 positioned via vascular access to the left pericardiophrenic or right brachiocephalic vein. The distal end of the lead 474 is positioned such that the electrodes are capable of pacing the phrenic nerve and therefore exciting the diaphragm. Fluid Status Monitoring device 104, as described previously, is capable of detecting an IVC area and therefore fluid volume. This information is relayed to the pulse generator either directly via Bluetooth or other communication protocol or via an externally worn belt antenna 108.

Vascular Flow Assist

Another interventional device used in treating patients at various stages of heart failure is an implanted or catheter-based pump to assist vascular flow. Treatment with such assist pumps may be more closely matched to patient clinical need by modulating pump operation based on real-time patient fluid status information as determined by Fluid Management System 102 when used as a control input to the assist pump. One type of assist system that would be beneficially augmented with control based on signals from a Monitoring Device 104 is an intracardiac pump used to support the natural pumping function of the heart. One example of an intracardiac pump is described in US Published Patent Application No. US2010/026801 A1, filed Jan. 6, 2006 (now U.S. Pat. No. 9,872,948), entitled "Intracardiac Pumping Device."

Therapeutic vascular assist pumps are also proposed to be implanted in the IVC or renal veins to increase flow rate in the IVC and reduce the renal vein pressure, thus mechanically unloading the kidneys and assisting kidney function. Such therapies may also lead to the excretion of more fluid from the body and lead to changes in patient fluid state. However, current systems do not include an ability to evaluate the intravascular fluid status of the patient as an input into the therapy. Current methodologies for fluid state monitoring, such as measuring urine output and/or blood pressure monitoring, may not provide sufficiently real-time information on patient fluid state to adequately facilitate system modulation. To avoid fluid imbalance when utilizing such therapies, it would be preferable to modulate system operation with input based on accurate patient fluid state information. The combination of these systems with the aforementioned Fluid Management System 102 (FIG. 1) including Fluid Status Monitoring device 104 would enable the combined system to be adjusted based on the intravascular fluid status of the patient and therefore optimize their therapy.

Figure 11A:
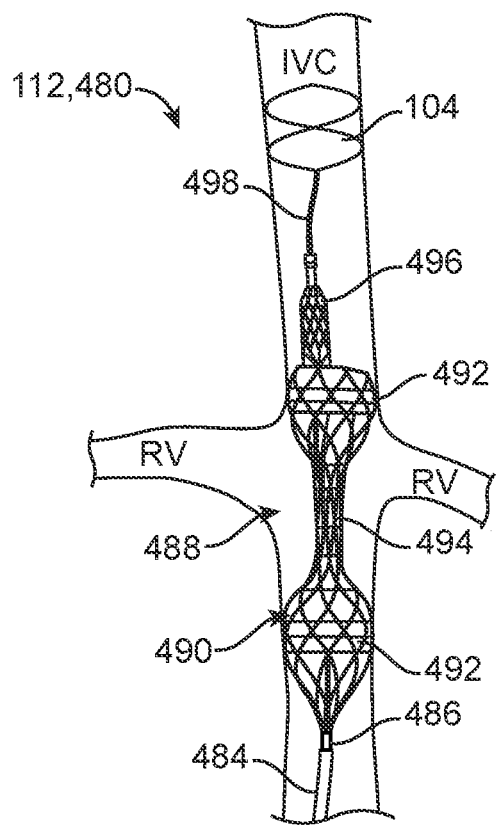
FIGS. 11A and 11B are schematic depictions of patient treatment systems including IVC or renal vein assist with integrated fluid monitoring.
Figure 11B:
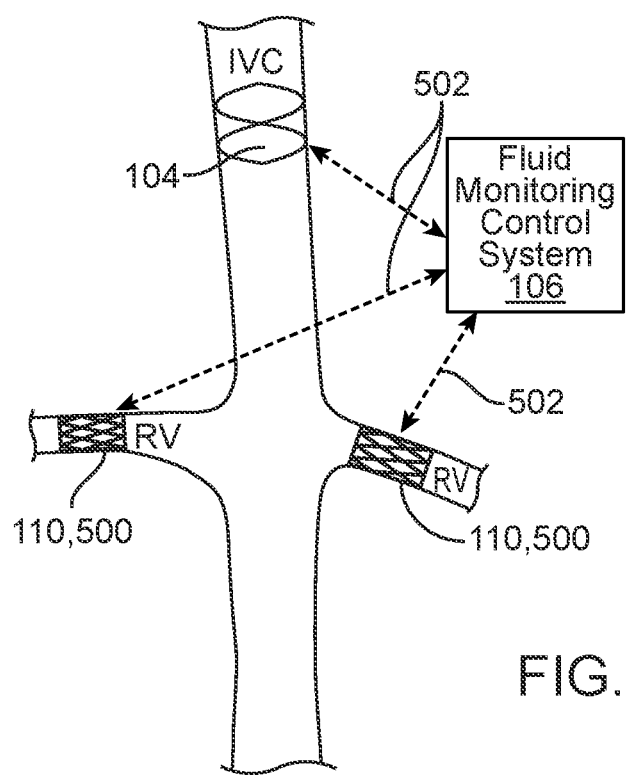

Examples of such combined systems are shown in FIGS. 11A and 11B. FIG. 11A shows an external therapy device 112 configured as catheter-based IVC assist pump system 480. As shown therein, external therapy device 112/480 includes guide catheter 484 for guiding flexible elongate delivery member 486 to a position adjacent the therapy site in the IVC. Delivery member 486 has disposed at its distal end, expandable and collapsible pump system 488. Pump system 488 comprises a body member 490 surrounded by an expandable cage. In some embodiments the body member may also include flexible covering to provide IVC occlusion. One or more collapsible impeller pumps 492 are disposed within body member 490. Central portion 494 may include a portion of the expandable cage as shown or may comprise only a portion of delivery member 486 and may include sensors such as a pressure sensor. Distal end 496 has an atraumatic configuration and may include additional flow or pressure sensors. Distal end 496 also provides a distal port to central lumen (not shown) for passage of sensor delivery member 498 which has an embodiment of Fluid Status Monitoring Device 104 distally disposed thereon. Pumps 492 and Monitoring Device 104 may communicate with a control system such as Fluid Monitoring Control System 106 (e.g., FIG. 1) through wired connections in delivery members 486 and 498.

FIG. 11B illustrates an example of an alternative renal assist system using wireless implanted therapy devices/renal assist pumps 500. Renal assist pumps 500 communicate via wireless communication links 502 with Fluid Monitoring Control System 106. Another wireless communication link 502 also provides communication between the control system and wireless Fluid Status Monitoring Device 104 as previously described. Examples and more details of renal assist pumps for positioning in the IVC or renal veins are shown in, for example, U.S. Patent Publication No. US20200254161A1, filed Apr. 27, 2020, and published August 13, 202, entitled "Blood Pump", and U.S. Patent Publication No. US20200069857A1, filed Nov. 8, 2019, and published Mar. 5, 2020, entitled "Venal-Caval Blood Pump".

In systems 112/480 and 110/500, wired or wireless Fluid Status Monitoring Device 104 is used to determine fluid status by measuring dimensional parameters of the IVC (as previously disclosed). Thus, using fluid monitoring system 106 as described hereinabove, communicating with the respective pump systems, the performance (e.g., speed and duration of operation) of the pumps is controlled using the IVC data from monitoring device 104 as an input. Renal assist systems as disclosed herein would thus operate based on the IVC dimensional monitor 104 providing an output signal which is communicated (via Bluetooth®, wi-fi or other means) to the renal decongestion pump. The pump receives this signal via a powered communications module, processes the signal and determines what action/therapy to take based on an algorithm. The pump-operating parameters would be controlled to manage the pump performance in response to the IVC measurement signals. These parameters may include the speed and operation duration of the pump.

Diuretic Patch Pump

Advances in micro-pump technology have made wearable patch pumps a practical alternative for automated ambulatory drug dosing. Embodiments disclosed herein utilize such patch pumps for drug delivery therapies for diuretic, vasodilator or other heart failure medication or combination of medications. For example, Fluid Status Monitoring Device 104 communicating through control system 106 may be used to determine fluid status by measuring dimensional parameters of the IVC (as previously disclosed). This information is combined as an input to the patch pump to deliver a therapeutic agent. The response of the body to this is monitored using the IVC sensor and the delivery of the therapeutic agent modified as required based on a pre-programmed algorithm.

Figure 12A:
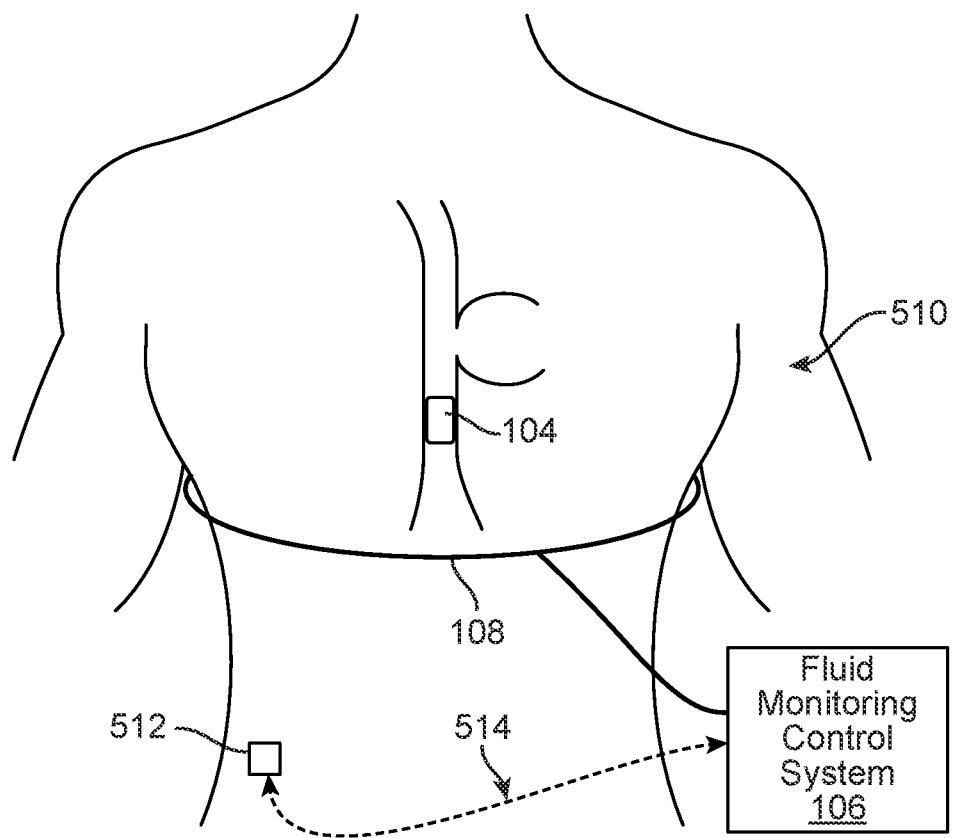
FIGS. 12A and 12B are schematic depictions of a patient treatment system including a patch pump for diuretic or other therapeutic agent with integrated fluid monitoring.
Figure 12B:
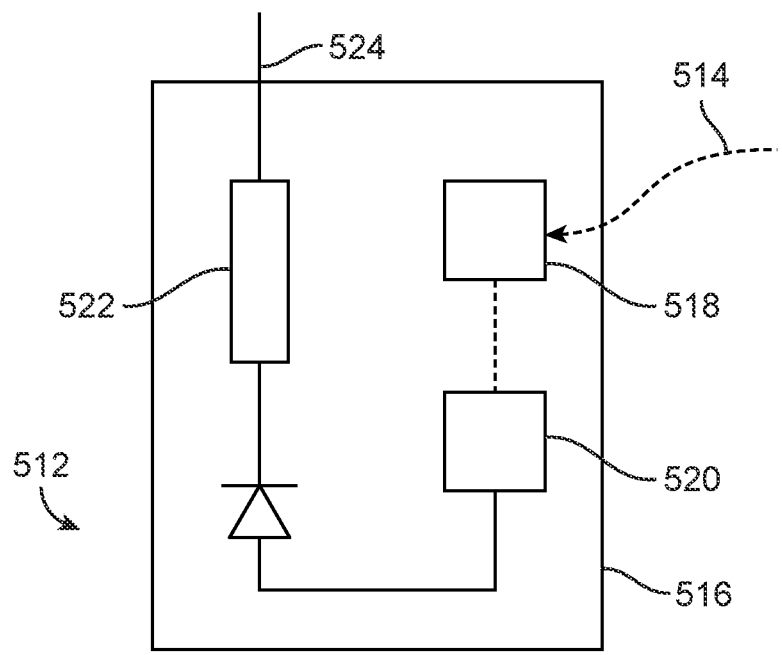

FIGS. 12A and 12B illustrate an embodiment of such a patch pump system. As shown therein, system 510 employs patch pump 512 communicating with control system 106 via wired or wireless communications link 514. As previously described, control system 106 also communicates with and energizes monitoring device 104 via belt antenna 108. Communications link 514 may be via Bluetooth®, wi-fi or other means. Patch pump 512, as shown in FIG. 12B, includes housing 516 with a skin adherable surface. Contained within or supported by housing 516 are components such as processor/power module 518, drive motor 520, pump module 522 and needle 524. Pump module 522 contains the therapeutic agent and may comprise a variety of micro-pump technologies such as syringe pumps or micro-rotary piston pumps. Further details of suitable pumps are described for example in US Patent Publication No. US20190358393A1, filed Nov. 7, 2017, and published Nov. 28, 2019, entitled "Drug Delivery Device".

In operation, pump 512 receives a signal via communications link 514 and processes the signal representing patient fluid state and determines what action to take based on a drug delivery algorithm. In alternative embodiments, the drug delivery algorithm is contained within and executed by control system 106 and the control signal to patch pump 512 then comprises a direct pump control signal. As will be appreciated by persons skilled in the art, while these embodiments are exemplified by a patch pump, the systems described above could also comprise a subcutaneous implanted pump with the same control system.

Each of the patents and published patent applications cited hereinabove are incorporated herein by reference in its entirety.

The foregoing has been a detailed description of illustrative embodiments of the disclosure. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure or of the inventions as set forth in following claims.

What is claimed is:

1. An integrated patient fluid management system, comprising:
    an interventional device configured to effect a change in patient fluid state by delivery of an interventional therapy;
    a wireless vascular dimension monitoring sensor configured to be implanted within a patient's inferior vena cava (TVC) and to monitor changes in dimension of the IVC resulting from changes in patient fluid state; and
    a control system configured to (i) communicate with the interventional device and the wireless vascular dimension monitoring sensor and (ii) modulate the delivered interventional therapy in response to TVC dimension measurements as determined by the wireless vascular dimension monitoring sensor;
    wherein the wireless vascular dimension monitoring sensor is a wireless resonant circuit-based sensor;
    wherein the wireless vascular dimension monitoring sensor comprises a resiliently collapsible frame member with multiple strands of individually insulated conductive wires wrapped on the resiliently collapsible frame member to form a variable inductance coil, the inductance varying in proportion to changes in dimension of the IVC.

2. The integrated patient fluid management system of claim 1, wherein the wireless vascular dimension monitoring sensor determines changes in the vascular lumen dimension in at least near-real time.

3. The integrated patient fluid management system of claim 1, wherein the interventional device comprises an assisted diuresis system including an external infusion pump.

4. The integrated patient fluid management system of claim 1, wherein the interventional device comprises a hydration system configured to treat contrast induced nephropathy.

5. The integrated patient fluid management system of claim 1, wherein the interventional device comprises a direct sodium removal system including an implanted pump.

6. The integrated patient fluid management system of claim 1, wherein the interventional device comprises a home dialysis system.

7. The integrated patient fluid management system of claim 1, wherein the interventional device comprises an IVC or SVC occlusion device.

8. The integrated patient fluid management system of claim 1, wherein the interventional device comprises a lymphatic assist pump.

9. The integrated patient fluid management system of claim 1, wherein the interventional device comprises a diaphragm stimulation system.

10. The integrated patient fluid management system of claim 1, wherein the interventional device comprises a venous flow assist pump positioned in the IVC or a renal vein.

11. The integrated patient fluid management system of claim 1, wherein the interventional device comprises a patient wearable patch infusion pump.

12. The integrated patient fluid management system of claim 1, wherein said system further comprises an interstitial fluid monitoring sensor communicating with the control system.

13. The integrated patient fluid management system of claim 1, wherein the interventional device comprises at least one of an implanted system or an external system.

14. The integrated patient fluid management system of claim 1, wherein the wireless vascular dimension monitoring sensor further comprises a capacitor electrically connected to opposite ends of the multiple strands of individually insulated conductive wires wrapped on the resilience collapsible frame member to form a resonant circuit with a variable characteristic frequency.

15. An integrated patient fluid management method, comprising:
   setting a desired fluid loss goal by inputting the desired fluid loss goal into a system controller comprising a processor and memory;
   monitoring changes in dimension of a patient Inferior Vena Cava (IVC) resulting from changes in patient fluid state using a wireless vascular dimension monitoring sensor implanted within the IVC;
   determining changes in patient fluid status by wirelessly receiving and interpreting a signal from the vascular dimension monitoring sensor correlating change in IVC dimension to change in patient fluid status;
   administering a diuretic to the patient; and automatically administering a fluid to the patient by an infusion pump under control of the system controller until the desired fluid loss goal is reached,
   wherein the wireless vascular dimension monitoring sensor comprises a single resiliently collapsible frame member with multiple strands of individually insulated conductive wires wrapped on the resiliently collapsible frame member to form a variable inductance coil, the inductance varying in proportion to changes in dimension of the IVC.

16. The integrated patient fluid management method of claim 15, further comprising:
   monitoring urine output rate from the patient using the system controller; and
   automatically administering fluid to the patient by an infusion pump under control of the system controller at rates equal to or approximately equal to monitored urine output rates.

17. The integrated patient fluid management method of claim 15, wherein the wireless vascular dimension monitoring sensor further comprises a capacitor electrically connected to opposite ends of the multiple strands of individually insulated conductive wires wrapped on the resilience collapsible frame member to form a resonant circuit with a variable characteristic frequency correlated to IVC dimension.

18. An integrated patient fluid management system, comprising:
   an interventional device configured to effect a change in patient fluid state by delivery of an interventional therapy;
   a wireless, resonant circuit-based vascular dimension monitoring sensor configured to be implanted within a patient's inferior vena cava (IVC) and to monitor changes in dimension of the IVC resulting from changes in patient fluid state, wherein said vascular dimension monitoring sensor comprises a single resiliently collapsible frame member with multiple strands of individually insulated conductive wires wrapped on the resiliently collapsible frame member to form a variable inductance coil, the inductance varying in proportion to changes in dimension of the IVC; and
   a control system configured to (i) communicate with the interventional device and the vascular dimension monitoring sensor and (ii) modulate the delivered interventional therapy in response to IVC dimension measurements as determined by the vascular dimension monitoring sensor.

19. The integrated patient fluid management system of claim 18, wherein the wireless, resonant circuit-based vascular dimension monitoring sensor further comprises a capacitor electrically connected to opposite ends of the multiple strands of individually insulated conductive wires wrapped on the resilience collapsible frame member to form a resonant circuit with a variable characteristic frequency.

* * * * *